(12) United States Patent
Zarifi

(10) Patent No.: US 12,501,377 B2
(45) Date of Patent: Dec. 16, 2025

(54) SOUNDING REFERENCE SIGNAL FOR UPLINK-BASED MULTI-CELL MEASUREMENT

(71) Applicant: Huawei Technologies Co., Ltd., Shenzhen (CN)

(72) Inventor: Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/731,347

(22) Filed: Dec. 31, 2019

(65) Prior Publication Data

US 2020/0221405 A1 Jul. 9, 2020

Related U.S. Application Data

(60) Provisional application No. 62/788,165, filed on Jan. 4, 2019.

(51) Int. Cl.
*H04W 56/00* (2009.01)
*H04L 5/00* (2006.01)
*H04W 52/24* (2009.01)
*H04W 52/32* (2009.01)
*H04W 72/30* (2023.01)

(52) U.S. Cl.
CPC ......... *H04W 56/001* (2013.01); *H04L 5/0053* (2013.01); *H04W 52/242* (2013.01); *H04W 52/322* (2013.01); *H04W 72/30* (2023.01)

(58) Field of Classification Search
None
See application file for complete search history.

(56) References Cited

U.S. PATENT DOCUMENTS

| 11,006,457 | B2* | 5/2021 | Shin | H04W 48/12 |
| 2013/0083683 | A1* | 4/2013 | Hwang | H04L 43/08 370/252 |
| 2013/0310077 | A1* | 11/2013 | Siomina | H04W 4/02 455/456.2 |
| 2014/0094216 | A1* | 4/2014 | Park | H04W 24/08 455/522 |

(Continued)

FOREIGN PATENT DOCUMENTS

| CN | 102461292 A | 5/2012 |
| CN | 103609174 A | 2/2014 |

(Continued)

OTHER PUBLICATIONS

Fraunhofer IIS:"NR beam management supporting multi-gNB measurements for positioning", 3GPP TSG RAN WG1 Meeting #95, R1-1813583, Spokane, US, Nov. 12-16, 2018. total 8 pages.

(Continued)

*Primary Examiner* — Chirag G Shah
*Assistant Examiner* — Suk Jin Kang
(74) *Attorney, Agent, or Firm* — Slater Matsil, LLP

(57) ABSTRACT

Aspects of the present application provide methods and devices in a communication network that aid in implementing sounding reference signal (SRS) measurement by multiple cells (i.e. serving cells and non-serving cells, also known as "neighbor cells") as well as NR LMUs. This enhanced SRS measurement based on multiple cell and/or NR LMU measurements may facilitate more beneficial usages such as UL-based positioning and UL-based mobility.

28 Claims, 13 Drawing Sheets

(56) References Cited

U.S. PATENT DOCUMENTS

| | | | |
|---|---|---|---|
| 2017/0264409 A1* | 9/2017 | Guo | H04B 7/0413 |
| 2019/0068348 A1* | 2/2019 | Nam | H04L 5/0053 |
| 2019/0132066 A1* | 5/2019 | Park | H04W 36/0079 |
| 2019/0174466 A1* | 6/2019 | Zhang | H04W 72/042 |
| 2019/0215712 A1* | 7/2019 | Babaei | H04L 1/1812 |
| 2019/0223084 A1* | 7/2019 | John Wilson | H04L 5/0044 |
| 2019/0261320 A1* | 8/2019 | Yu | H04L 5/0048 |
| 2019/0327115 A1* | 10/2019 | Zhang | H04B 7/0617 |
| 2019/0349867 A1* | 11/2019 | MolavianJazi | H04W 52/40 |
| 2019/0372806 A1* | 12/2019 | Park | H04W 52/146 |
| 2020/0015236 A1* | 1/2020 | Kung | H04W 72/0413 |
| 2020/0052802 A1* | 2/2020 | Ryu | H04W 52/146 |
| 2020/0053579 A1* | 2/2020 | Lu | H04B 17/309 |
| 2020/0053724 A1* | 2/2020 | MolavianJazi | H04W 52/146 |
| 2020/0053743 A1* | 2/2020 | Cheng | H04L 5/0048 |
| 2020/0107277 A1* | 4/2020 | Jeon | H04W 52/228 |
| 2020/0119799 A1* | 4/2020 | Jung | H04W 52/36 |
| 2020/0127724 A1* | 4/2020 | Kang | H04L 5/0094 |
| 2020/0146059 A1* | 5/2020 | Cirik | H04L 5/0007 |
| 2020/0205093 A1* | 6/2020 | Kim | H04W 52/42 |
| 2020/0229058 A1* | 7/2020 | Park | H04B 17/309 |
| 2020/0252241 A1* | 8/2020 | Park | H04L 25/0226 |
| 2020/0287753 A1* | 9/2020 | Park | H04L 5/005 |
| 2020/0305144 A1* | 9/2020 | Babaei | H04L 5/0098 |
| 2020/0351950 A1* | 11/2020 | Liu | H04W 72/0453 |
| 2020/0383103 A1* | 12/2020 | Zhou | H04B 7/02 |
| 2020/0403749 A1* | 12/2020 | Park | H04L 5/0048 |
| 2021/0007065 A1* | 1/2021 | Ko | H04W 76/11 |
| 2021/0014808 A1* | 1/2021 | Takahashi | H04J 11/0076 |
| 2021/0021333 A1* | 1/2021 | Kusashima | H04W 52/24 |
| 2021/0037488 A1* | 2/2021 | Ko | H04W 72/0493 |
| 2021/0037489 A1* | 2/2021 | Takahashi | H04J 11/0086 |
| 2021/0099963 A1* | 4/2021 | Jeon | H04W 74/0866 |
| 2021/0100041 A1* | 4/2021 | Jung | H04W 74/0891 |
| 2021/0105753 A1* | 4/2021 | Zhang | H04L 5/0048 |
| 2021/0105860 A1* | 4/2021 | Tsai | H04L 5/0044 |
| 2021/0120482 A1* | 4/2021 | Takahashi | H04W 12/122 |
| 2021/0144796 A1* | 5/2021 | Wu | H04L 1/16 |
| 2021/0153137 A1* | 5/2021 | MolavianJazi | H04W 52/16 |
| 2021/0160905 A1* | 5/2021 | Liou | H04L 5/0044 |
| 2021/0168748 A1* | 6/2021 | Miao | H04L 5/0023 |
| 2021/0211987 A1* | 7/2021 | MolavianJazi | H04W 52/367 |
| 2021/0218613 A1* | 7/2021 | Park | H04J 11/0073 |
| 2021/0235390 A1* | 7/2021 | Lin | H04W 72/23 |
| 2021/0274562 A1* | 9/2021 | Takeda | H04W 56/001 |
| 2021/0352613 A1* | 11/2021 | Yoon | H04L 5/0032 |
| 2021/0392531 A1* | 12/2021 | Lu | H04W 52/146 |
| 2021/0392641 A1* | 12/2021 | Si | H04W 72/23 |
| 2022/0003830 A1* | 1/2022 | Cha | H04B 17/24 |
| 2022/0014284 A1* | 1/2022 | Ryu | H04W 72/21 |
| 2022/0030478 A1* | 1/2022 | Shi | H04W 36/0061 |
| 2022/0191065 A1* | 6/2022 | Park | H04B 7/0639 |
| 2022/0217651 A1* | 7/2022 | Papasakellariou | H04W 52/325 |
| 2022/0377676 A1* | 11/2022 | MolavianJazi | H04W 52/08 |

FOREIGN PATENT DOCUMENTS

| | | |
|---|---|---|
| CN | 103797871 A | 5/2014 |
| CN | 104247287 A | 12/2014 |
| CN | 104322120 A | 1/2015 |
| CN | 105284172 A | 1/2016 |
| CN | 105379369 A | 3/2016 |
| CN | 107005994 A | 8/2017 |
| CN | 108419257 A | 8/2018 |
| CN | 108605298 A | 9/2018 |
| WO | 2013141771 A1 | 9/2013 |
| WO | 2018203728 A1 | 11/2018 |
| WO | 2018228437 A1 | 12/2018 |

OTHER PUBLICATIONS

CATT:"NR Positioning Evaluation Scenarios and Methodologies", 3GPP TSG RAN WG1 Meeting #95, R1-1812614, Spokane, USA, Nov. 12-16, 2018. total 6 pages.

3rd Generation Partnership Project; Technical Specification Group Radio Access Network; NR; "Physical layer procedures for control" (Release 15), 3GPP TS 38.213 V15.3.0, Sep. 2018, 101 pages.

3rd Generation Partnership Project; Technical Specification Group Radio Access Network; NR; "Physical layer procedures for data" (Release 15), 3GPP TS 38.214 V15.3.0, Sep. 2018, 96 pages.

3rd Generation Partnership Project; Technical Specification Group Radio Access Network; NR; "Radio Resource Control (RRC) protocol specification" (Release 15), 3GPP TS 38.331 V15.3.0, Sep. 2018, 445 pages.

MCC Support, "Final Report of 3GPP TSG RAN WG1 #94bis v1.1.0 (Chengdu, China, Oct. 8-12, 2018)", 3GPP TSG RAN WG1 Meeting #95, R1-1813901, Nov. 12-16, 2018, 197 Pages, Spokane, USA.

* cited by examiner

SOUNDING REFERENCE SIGNAL FOR UPLINK-BASED MULTI-CELL MEASUREMENT

RELATED APPLICATIONS

This application claims the benefit of priority of U.S. Provisional Patent Application 62/788,165 filed on Jan. 4, 2019, which is hereby incorporated by reference in its entirety.

TECHNICAL FIELD

The present disclosure relates generally to wireless communications, and in particular embodiments, to systems and methods for generating and utilizing a sounding reference signal (SRS) for uplink-based multi-cell measurement.

BACKGROUND

In traditional cellular networks, each cell is associated with a coverage area and includes one or multiple transmit-receive points (TRPs), each comprising a radio frequency transceiver for transmitting and receiving wireless signals. Each cell is assigned a physical cell identifier (PCID) that may be common among all TRPs within the cell. The PCID in part facilitates control channel and data channel communications from cell to user equipment (UE) and UE to cell. The network may maintain the association between a cell presently serving a UE (a "serving cell") and the UE, through an assigned PCID, until a handover is triggered.

Other than TRPs that can in general transmit/receive both data and control channel signals, the network may be equipped with other physical entities such as new radio location measurement units (NR LMUs). The NR LMU may be
- integrated with a cell or a TRP that belongs to the cell; or
- collocated with a cell or a TRP that belongs to the cell and share antennas with the cell or TRP; or
- located elsewhere within a coverage area of a cell, the NR LMU having its own antennas.

In contrast to LTE, LM Us that only measure received sounding reference signal (SRS) from a UE for the purpose of determining the location of the UE, NR LM Us comprise at least a radio frequency receiver/transmitter for receiving/transmitting wireless signals such as reference signals received from/transmitted to the UEs. These reference signals are used in the process of determining the location of the UE. Conventionally, NR LMUs are not configured to directly communicate data or control channels to the UE. NR LMUs typically forward the acquired measurements to another network entity called a location measurement function (LMF). Examples of the LMF include Enhanced (or Evolved) Serving Mobile Location Center (E-SMLC), or LTE location measurement function (LMF) or new radio location measurement function (NR LMF). The final positioning (determining the location) of the UE is performed by the LMF.

UEs transmit a SRS that can be used by a network side device in determining channel characteristics about the channel between the UE and network device. After measuring the SRS, the network side device can tailor transmission characteristics for downlink transmission from the network side device to the UE. Currently the use of SRS is performed with regard to network side device that serves the UE, i.e. a serving cell. That is, the SRS is meant to be measured only by the serving cell.

SRS for the New Radio (NR) standard is currently configured for four different usages: 1) Beamforming, 2) Codebook-based transmission, 3) Non-codebook-based transmission, and 4) Antenna switching (for the purpose of DL CSI acquisition).

SUMMARY

Aspects of the present application provide methods and devices in a communication network that aid in implementing sounding reference signal (SRS) measurement by multiple cells, i.e. serving cells and neighbor cells. Multiple cell SRS measurement may facilitate usages such as UL-based positioning and UL-based mobility.

According to an aspect of the disclosure, there is provided a method involving receiving, by a user equipment (UE), downlink (DL) reference signal (RS) configuration information from a serving cell network device, the DL RS configuration information associated with the serving cell network device or a non-serving cell network device, for configuring the UE to receive a DL RS from the non-serving cell network device; receiving, by the UE, the DL RS from the non-serving cell network device; and transmitting, by the UE, a sounding reference signal (SRS), the SRS transmitted in accordance with a transmission parameter based on the received DL RS.

In some embodiments, the DL RS is a Synchronization Signal/Physical Broadcast Channel (SS/PBCH) block.

In some embodiments, the transmission parameter is a spatial domain transmission filter based on the received SS/PBCH block.

In some embodiments, transmitting the SRS comprises transmitting the SRS with the spatial domain transmission filter, the spatial domain transmission filter being the same as a spatial domain filter used for receiving the SS/PBCH block.

In some embodiments, the DL RS configuration information is received using higher layer signaling, and comprises a "spatialRelationInfo" parameter for indicating the SS/PBCH block used for obtaining the spatial domain transmission filter.

In some embodiments, the DL RS configuration information comprises an indication of: a SS/PBCH block frequency location; a SS/PBCH block subcarrier spacing; a SS/PBCH block index; a physical cell identifier (PCID) of the cell transmitting the SS/PBCH block; and at least one of: a timing reference to obtain the time location of the SS/PBCH block; or a SS/PBCH block measurement timing configuration (SMTC) window indication including both periodicity and offset.

In some embodiments, the SS/PBCH block frequency location is a New Radio Absolute Radio Frequency Channel Number (NR-ARFCN) value.

In some embodiments, the timing reference is a timing of a primary cell (Pcell).

In some embodiments, the transmission parameter is a transmit power based on the received SS/PBCH block.

In some embodiments, transmitting the SRS comprises transmitting the SRS using the transmit power based on a pathloss estimated from the received SS/PBCH block.

In some embodiments, the DL RS configuration information is received using higher layer signaling, and comprises a "pathlossReferenceRS" parameter for indicating the received SS/PBCH block used for estimating the pathloss.

In some embodiments, transmitting the SRS comprises transmitting an SRS resource of an SRS resource set in accordance with the transmission parameter based on the received SS/PBCH block.

In some embodiments, transmitting the SRS comprises transmitting all SRS resources of an SRS resource set in accordance with the transmission parameter based on the received SS/PBCH block.

According to an aspect of the disclosure, there is provided an user equipment (UE) including a processor and a computer-readable storage medium. The computer-readable storage medium has stored thereon, computer-executable instructions that when executed by the processor cause the UE to: receive, by the UE, downlink (DL) reference signal (RS) configuration information from a serving cell network device, the DL RS configuration information associated with the serving cell network device or a non-serving cell network device, for configuring the UE to receive a DL RS from the non-serving cell network device; receive, by the UE, the DL RS from the non-serving cell network device; and transmit, by the UE, a sounding reference signal (SRS), the SRS transmitted in accordance with a transmission parameter based on the received DL RS.

In some embodiments, the DL RS is a Synchronization Signal/Physical Broadcast Channel (SS/PBCH) block.

In some embodiments, the transmission parameter is a spatial domain transmission filter based on the received SS/PBCH block.

In some embodiments, the computer-executable instructions that when executed by the processor cause the UE to transmit the SRS with the spatial domain transmission filter, the spatial domain transmission filter being the same as a spatial domain filter used for receiving the SS/PBCH block.

In some embodiments, the DL RS configuration information is received using higher layer signaling, and comprises a "spatialRelationInfo" parameter for indicating the SS/PBCH block used for obtaining the spatial domain transmission filter.

In some embodiments, the DL RS configuration information comprises an indication of: a SS/PBCH block frequency location; a SS/PBCH block subcarrier spacing; a SS/PBCH block index; a physical cell identifier (PCID) of the cell transmitting the SS/PBCH block; and at least one of: a timing reference to obtain the time location of the SS/PBCH block; or a SS/PBCH block measurement timing configuration (SMTC) window indication including both periodicity and offset.

In some embodiments, the SS/PBCH block frequency location is a New Radio Absolute Radio Frequency Channel Number (NR-ARFCN) value.

In some embodiments, the timing reference is a timing of a primary cell (Pcell).

In some embodiments, the transmission parameter is a transmit power based on the received SS/PBCH block.

In some embodiments, the computer-executable instructions that when executed by the processor cause the UE transmitting the SRS cause the UE to transmit the SRS using the transmit power based on a pathloss estimated from the received SS/PBCH block.

In some embodiments, the DL RS configuration information is received using higher layer signaling, and comprises a "pathlossReferenceRS" parameter for indicating the received SS/PBCH block used for estimating the pathloss.

In some embodiments, the computer-executable instructions that when executed by the processor cause the UE transmit the SRS cause the UE to transmit an SRS resource of an SRS resource set in accordance with the transmission parameter based on the received SS/PBCH block.

In some embodiments, the computer-executable instructions that when executed by the processor cause the UE to transmit the SRS cause the UE to transmit all SRS resources of an SRS resource set in accordance with the transmission parameter based on the received SS/PBCH block.

According to an aspect of the disclosure, there is provided a method involving in response to a user equipment (UE) failing to detect a first SS/PBCH block configured to the UE for pathloss estimation, receiving, by the UE, a second SS/PBCH block from a serving cell network device, the second SS/PBCH used for obtaining a Master Information Block (MIB); estimating, by the UE, the pathloss from the second SS/PBCH block; and transmitting, by the UE, a sounding reference signal (SRS) to at least one of the serving cell network device or a non-serving cell network device using a transmit power based on the estimated pathloss.

According to an aspect of the disclosure, there is provided a UE including a processor and a computer-readable storage medium. The computer-readable storage medium has stored thereon, computer-executable instructions that when executed by the processor cause the UE to: in response to the UE failing to detect a first SS/PBCH block configured to the UE for pathloss estimation, receiving, by the UE, a second SS/PBCH block from a serving cell network device, the second SS/PBCH used for obtaining a Master Information Block (MIB); estimating, by the UE, the pathloss from the second SS/PBCH block; and transmitting, by the UE, a sounding reference signal (SRS) to at least one of the serving cell network device or a non-serving cell network device using a transmit power based on the estimated pathloss.

According to an aspect of the disclosure, there is provided a method involving: transmitting, by a serving cell network device, downlink (DL) reference signal (RS) configuration information to a user equipment (UE), the DL RS configuration information associated with the serving cell network device or a non-serving cell network device for configuring the UE to receive a DL RS from the non-serving cell network device and for configuring the UE to transmit a sounding reference signal (SRS) in accordance with a transmission parameter based on the DL RS from the non-serving cell network device.

In some embodiments, the DL RS is a Synchronization Signal/Physical Broadcast Channel (SS/PBCH) block.

In some embodiments, the transmission parameter is a spatial domain transmission filter based on the SS/PBCH block from the non-serving cell network device.

In some embodiments, the DL RS configuration information is transmitted using higher layer signaling, and the higher layer signaling comprises a "spatialRelationInfo" parameter for indicating the SS/PBCH block used for obtaining the spatial domain transmission filter.

In some embodiments, the DL RS configuration information includes an indication of: a SS/PBCH block frequency location; a SS/PBCH block subcarrier spacing; a SS/PBCH block index; a physical cell identifier (PCID) of the cell transmitting the SS/PBCH block; and at least one of: a timing reference to obtain the time location of the SS/PBCH block; or a SS/PBCH block measurement timing configuration (SMTC) window indication including both periodicity and offset.

In some embodiments, the SS/PBCH block frequency location is a New Radio Absolute Radio Frequency Channel Number (NR-ARFCN) value.

In some embodiments, the timing reference is a timing of a primary cell (Pcell).

In some embodiments, the transmission parameter is a transmit power based on the SS/PBCH block from the non-serving cell network device.

In some embodiments, the transmit power is based on a pathloss estimated from the SS/PBCH block.

In some embodiments, the DL RS configuration information is transmitted using higher layer signaling, and includes a "pathlossReferenceRS" parameter for indicating the SS/PBCH block used for estimating the pathloss.

In some embodiments, the method further involves receiving, by the serving cell network device, the DL RS configuration information from the non-serving cell network device prior to transmitting the DL RS configuration information to the UE.

According to an aspect of the disclosure, there is provided a serving cell network device including a processor and a computer-readable storage medium. The computer-readable storage medium has stored thereon, computer-executable instructions that when executed by the processor cause the serving cell network device to: transmit downlink (DL) reference signal (RS) configuration information to a user equipment (UE), the DL RS configuration information associated with the serving cell network device or a non-serving cell network device for configuring the UE to receive a DL RS from the non-serving cell network device and for configuring the UE to transmit a sounding reference signal (SRS) in accordance with a transmission parameter based on the DL RS from the non-serving cell network device.

In some embodiments, the DL RS is a Synchronization Signal/Physical Broadcast Channel (SS/PBCH) block.

In some embodiments, the transmission parameter is a spatial domain transmission filter based on the SS/PBCH block from the non-serving cell network device.

In some embodiments, the DL RS configuration information is transmitted using higher layer signaling, and the higher layer signaling includes a "spatialRelationInfo" parameter for indicating the SS/PBCH block used for obtaining the spatial domain transmission filter.

In some embodiments, the DL RS configuration information includes an indication of: a SS/PBCH block frequency location; a SS/PBCH block subcarrier spacing; a SS/PBCH block index; a physical cell identifier (PCID) of the cell transmitting the SS/PBCH block; and at least one of: a timing reference to obtain the time location of the SS/PBCH block; or a SS/PBCH block measurement timing configuration (SMTC) window indication including both periodicity and offset.

In some embodiments, the SS/PBCH block frequency location is a New Radio Absolute Radio Frequency Channel Number (NR-ARFCN) value.

In some embodiments, the timing reference is a timing of a primary cell (Pcell).

In some embodiments, the transmission parameter is a transmit power based on the SS/PBCH block from the non-serving cell network device.

In some embodiments, the transmit power is based on a pathloss estimated from the SS/PBCH block.

In some embodiments, the DL RS configuration information is transmitted using higher layer signaling, and includes a "pathlossReferenceRS" parameter for indicating the SS/PBCH block used for estimating the pathloss.

In some embodiments, the instructions executed by the processor cause the serving cell network device to receive the DL RS configuration information from the non-serving cell network device prior to transmitting the DL RS configuration information to the UE.

According to an aspect of the disclosure, there is provided a method comprising: transmitting, by a non-serving cell network device, a downlink (DL) reference signal (RS) to the UE, the DL RS indicated to the UE by DL RS configuration information from a serving cell network device, the DL RS configuration information associated with the serving cell network device or the non-serving cell network device; and receiving, by the non-serving cell network device, a sounding reference signal (SRS) from the UE, the SRS transmitted by the UE in accordance with a transmission parameter based on the transmitted DL RS.

In some embodiments, the DL RS is a Synchronization Signal/Physical Broadcast Channel (SS/PBCH) block.

In some embodiments, the transmission parameter is a spatial domain transmission filter based on the transmitted SS/PBCH block.

In some embodiments, the DL RS configuration information includes a "spatialRelationInfo" parameter for indicating the SS/PBCH block used for obtaining the spatial domain transmission filter.

In some embodiments, the DL RS configuration information includes an indication of: a SS/PBCH block frequency location; a SS/PBCH block subcarrier spacing; a SS/PBCH block index; a physical cell identifier (PCID) of the cell transmitting the SS/PBCH block; and at least one of: a timing reference to obtain the time location of the SS/PBCH block; or a SS/PBCH block measurement timing configuration (SMTC) window indication including both periodicity and offset.

In some embodiments, the SS/PBCH block frequency location is a New Radio Absolute Radio Frequency Channel Number (NR-ARFCN) value.

In some embodiments, the timing reference is a timing of a primary cell (Pcell).

In some embodiments, the transmission parameter is a transmit power based on the received SS/PBCH block.

In some embodiments, the transmit power is based on a pathloss estimated from the SS/PBCH block.

In some embodiments, the DL RS configuration information comprises a "pathlossReferenceRS" parameter for indicating the SS/PBCH block used for estimating the pathloss.

In some embodiments, receiving the SRS includes receiving an SRS resource of an SRS resource set in accordance with the transmission parameter based on the received SS/PBCH block.

In some embodiments, receiving the SRS includes receiving all SRS resources of an SRS resource set in accordance with the transmission parameter based on the received SS/PBCH block.

In some embodiments, the method further involves transmitting, by the non-serving cell network device, the DL RS configuration information to the serving cell network device prior to transmitting the DL RS to the UE.

According to an aspect of the disclosure, there is provided a non-serving cell network device including a processor and a computer-readable storage medium. The computer-readable storage medium has stored thereon, computer-executable instructions that when executed by the processor cause the non-serving cell network device to: transmit a downlink (DL) reference signal (RS) to the UE, the DL RS indicated to the UE by DL RS configuration information from a serving cell network device, the DL RS configuration information associated with the serving cell network device or the non-serving cell network device; and receive a sounding reference signal (SRS) from the UE, the SRS transmitted by the UE in accordance with a transmission parameter based on the transmitted DL RS.

In some embodiments, the DL RS is a Synchronization Signal/Physical Broadcast Channel (SS/PBCH) block.

In some embodiments, the transmission parameter is a spatial domain transmission filter based on the transmitted SS/PBCH block.

In some embodiments, the DL RS configuration information includes a "spatialRelationInfo" parameter for indicating the SS/PBCH block used for obtaining the spatial domain transmission filter.

In some embodiments, the DL RS configuration information includes an indication of: a SS/PBCH block frequency location; a SS/PBCH block subcarrier spacing; a SS/PBCH block index; a physical cell identifier (PCID) of the cell transmitting the SS/PBCH block; and at least one of: a timing reference to obtain the time location of the SS/PBCH block; or a SS/PBCH block measurement timing configuration (SMTC) window indication including both periodicity and offset.

In some embodiments, the SS/PBCH block frequency location is a New Radio Absolute Radio Frequency Channel Number (NR-ARFCN) value.

In some embodiments, the timing reference is a timing of a primary cell (Pcell).

In some embodiments, the transmission parameter is a transmit power based on the received SS/PBCH block.

In some embodiments, the transmit power is based on a pathloss estimated from the SS/PBCH block.

In some embodiments, the DL RS configuration information includes a "pathlossReferenceRS" parameter for indicating the SS/PBCH block used for estimating the pathloss.

In some embodiments, receiving the SRS involves receiving an SRS resource of an SRS resource set in accordance with the transmission parameter based on the received SS/PBCH block.

In some embodiments, receiving the SRS involves receiving all SRS resources of an SRS resource set in accordance with the transmission parameter based on the received SS/PBCH block.

In some embodiments, the instructions executed by the processor cause the non-serving cell network device to transmit the DL RS configuration information to the serving cell network device prior to transmitting the DL RS to the UE.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION OF ILLUSTRATIVE EMBODIMENTS

Figure 1:
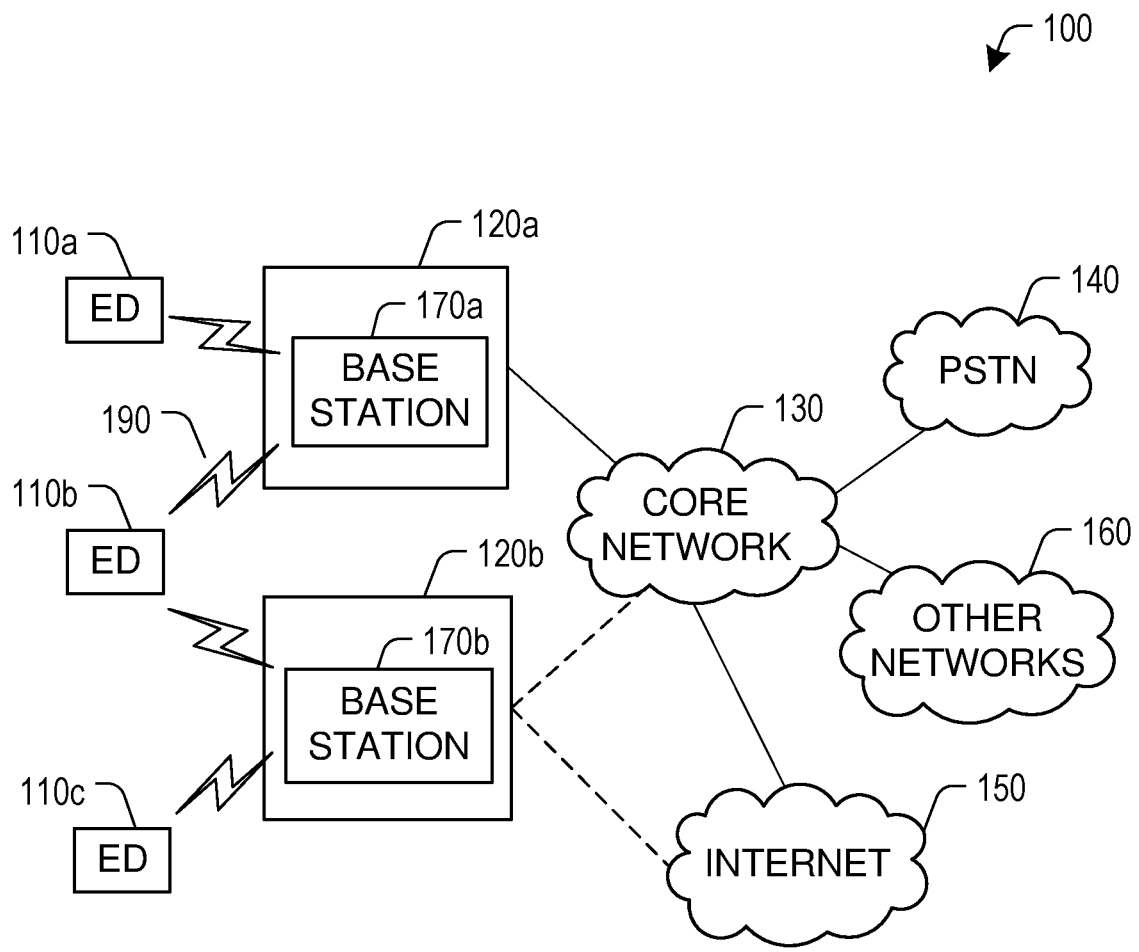
FIG. 1 illustrates an example communication system in which embodiments of the present disclosure could be implemented.

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device disclosed herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile discs (i.e. DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Computer/processor readable/executable instructions to implement an application or module described herein may be stored or otherwise held by such non-transitory computer/processor readable storage media.

Existing procedures that have been accepted into the New Radio (NR) standard do not provide for multiple cell SRS measurement. Currently, a UE may only transmit a sounding reference signal (SRS) to a TRP associated with a serving cell. Aspects of the present application provide methods and devices in a communication network that aid in implementing SRS measurement by multiple cells (i.e. serving cells and non-serving cells, also known as "neighbor cells") as well as NR LMUs. This enhanced SRS measurement based on multiple cell and/or NR LMU measurements may facilitate more beneficial usages such as UL-based positioning and UL-based mobility.

For simplicity and clarity, a "serving cell" is used herein to refer to a network device associated with the serving cell that actively serves the UE; a "non-serving cell" is used herein to refer to a network device associated with a cell other than the serving cell, such as a neighbor cell. Examples of non-serving cell network devices include NR LMUs, TRPs of neighbor cells, and base stations of neighbor cells.

In order to enable this enhanced SRS measurement, new methods are proposed. Some of the new methods may involve modifying some known methodologies. Modifying existing methods may allow for easier implementation with existing methods. In order to enable multiple cell and/or NR LMU SRS measurement, there are several issues that need to be addressed with respect to the conventional NR SRS measurement, which only relies on the serving cell.

A first issue therefore relates to enabling the UE to transmit an SRS to a transceiver that is not associated with the serving cell. In other words, the UE should be able to transmit an SRS to a non-serving cell or an NR LMU. In order to be able to use beamforming to transmit an SRS to a non-serving cell or an NR LMU, the UE is provided with SRS configuration parameters that include a collection of transmission variables that define or control the transmitted SRS signal. These transmission variables include, for instance, variables pertaining to spatial domain transmission filter, pathloss, transmission power, SRS periodicity and resource mapping. In particular, the SRS spatial domain transmission filter defines the directionality of the signal (e.g., beamforming parameters) and enables UE to send the SRS in the direction of the TRPs of the non-serving cell or the NR LMU.

Conventionally, the UE is able to determine the SRS spatial domain transmission filter for a TRP of a serving cell based on a first reference signal (RS) that is transmitted by the serving cell. This first reference signal may inform the UE about transmission variables pertaining to one or more of spatial domain transmission filter and pathloss.

The UE can listen for the first RS from the TRP of the serving cell using receive beams, and based on configuration information provided to the UE regarding where in the time-frequency resource the serving cell is sending the first RS, the UE can determine where the signal is strongest and associate that direction with the TRP of the serving cell. In a particular implementation, this configuration may involve using a "SRS-Spatial Relation Info" field in the "SRS-Resource" field of a "SRS-Config" message. The reference signal can be one of: 1) SS/PBCH block (synchronization signal/physical broadcast channel block) (SSB) resource; 2) channel state information reference signal (CSI-RS) resource; 3) sounding reference signal (SRS) resource.

In the case of "SRS-SpatialRelationInfo" is used as in the current 3GPP standard, the content of the field is SRS resource specific and includes a serving cell identifier (servingCellId), and one of the following three reference signal indicators: 1) SSB index; or 2) CSI-RS resource index; or 3) SRS Resource index, and a corresponding uplink bandwidth part (UL BWP).

The reference RS may be configured on a same or a different component carrier or bandwidth part, or both, as the target SRS.

If the configured RS transmitted by the serving cell is a SSB or CSI-RS resource, then the UE shall transmit the target SRS resource with a same spatial domain transmission filter that was used for the reception of the SSB or CSI-RS. If the RS is another SSB resource, then the UE may transmit the target SRS resource with a same spatial domain transmission filter used for the transmission of the indicated SRS.

RSs for determining the spatial transmission filter of SRS according to the existing 3GPP standard are configured by a serving cell, and are transmitted from the TRP(s) of a serving cell. A problem with this with regard to multi-cell and/or NR LMU SRS measurement is that when the SRS needs to be received by TRPs in non-serving cells or by NR LMUs, it is useless to transmit the RS resource from a serving cell. The RS should be typically sent from the same TRP or NR LMU that is supposed to receive/measure the SRS.

In an embodiment of the present disclosure, the first RS is used for determining the spatial domain transmission filter, and it may be known as a TF (transmission filter) RS. A TF RS resource(s) is used for determining the spatial domain transmission filter of the target SRS resource. Three TF RS resources are applicable: TF SSB resource, TF CSI-RS resource, and TF SRS resource.

Another issue of the conventional method of serving cell SRS measurement relates to determining the power with which to send the SRS signal to the TRP(s) of the non-serving cell and/or NR LMU. The SRS transmission power is determined using the following formula:

$$P_{SRS,b,f,c}(i, q_s, l) = \min \begin{cases} P_{CMAX,f,c}(i) \\ P_{o\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{cases}$$

where $P_{SRS,b,f,c}(i, q_s, l)$ is the total transmit power of a SRS in dBm over one SRS symbol in SRS resource set $q_s$ across all ports for uplink bandwidth part (UL BWP) b of carrier f of serving cell c in a power control (PC) adjustment state with index l in SRS transmission occasion i. The power in this representation is split among multiple ports equally.

$P_{CMAX,f,c}(i)$ is a maximum power that is defined in RAN4 (38.101-1/38.101-2). $P_{o\_SRS,b,f,c}(q_s)$ is a higher layer configured baseline power value per SRS resource set. $M_{SRS,b,f,c}(l)$ is SRS BW in resource blocks (RBs) per SRS resource. $\alpha_{SRS,b,f,c}(q_s)$ is a Higher layer configured scaling factor per SRS resource set where the default value is 1. $PL_{b,f,c}(q_d)$ is a calculated pathloss in dB based on the pathloss RS $q_d$ (higher layer parameter pathlossReferenceRS) configured in active downlink bandwidth part (DL BWP) of the same serving cell per SRS Resource Set. Note that a pathloss RS can be a CSI-RS resource or a SSB. In some embodiments, the pathloss RS can be indicated in "SRS-ResourceSet" field of "SRS-Config".

In an embodiment of the present disclosure, the first RS is used for determining the transmission power of an SRS, and the first RS may be known as a PL (pathloss) RS. A PL RS resource(s) is used for calculating the PL of the target SRS resource set. Two PL RS resources are applicable: PL SSB and PL CSI-RS resource.

In the current 3GPP standard, if the UE is not provided a PL RS resource (higher layer parameter "pathlossReferenceRS" in 38.331) or before the UE is provided dedicated higher layer parameters, the UE calculates $PL_{b,f,c}(q_d)$ using a RS resource obtained from the SS/PBCH block that the UE uses to obtain higher layer parameter MasterInformationBlock (MIB). As can be observed, PL RS is used to calculate PL to the serving cell which, itself, is used to determine the SRS transmission power that is required for SRS signal be received at the serving cell with enough power so it can be measured properly.

$h_{b,f,c}(i,l)$ is a power control (PC) adjustment value in state with index l in SRS transmission occasion i (Higher layer parameter "srs-PowerControlAdjustmentStates" configured per SRS resource set). Depending on the higher layer parameters "srs-PowerControlAdjustmentStates" and "tpc-Accumulation", behavior of the above PC adjustment value is one of the following:

1) is the current PUSCH power control adjustment state (default behaviour)
2) If the UE is not configured for PUSCH transmissions on active UL BWP b of carrier f of serving cell c, or if higher layer parameter "srs-PowerControlAdjustmentStates" indicates separate power control adjustment states between SRS transmissions and PUSCH transmissions, and "tpc-Accumulation" is provided $$h_{b,f,c}(i) = h_{b,f,c}(i-1) + \sum_{m=0}^{C(S_f)-1} \delta_{SRS,b,f,c}(m)$$

3) If the UE is not configured for PUSCH transmissions on active UL BWP b of carrier f of serving cell c, or if higher layer parameter "srs-PowerControlAdjustmentStates" indicates separate power control adjustment states between SRS transmissions and PUSCH transmissions, and if higher layer parameter "tpc-Accumulation" is not provided.

$h_{b,f,c}(i) = \delta_{SRS,b,f,c}(i)$

There are multiple problems with the current SRS power control (PC), several of which are described below.

Problem 1: Resource Set Specific PC Issue

SRS power control is per SRS resource set and all SRS resource sets are configured for (meant to be measured at) the serving cell. Since the enhanced SRS measurement of the present disclosure entails cells other than just the serving cell, as well as NR LMUs, measuring the SRS resource set, the network needs to be able to configure multiple SRS resource sets, each of which is meant to be measured by one serving cell/TRP or a neighboring cell/TRP or a NR LMU. Solutions to this issue will be addressed below.

Problem 2: Pathloss (PL) RS Issue

According to the current 3GPP standard, a PL RS resource is configured and transmitted from the serving cell/TRP. Transmitting from only the serving cell results in a problem for multi-cell SRS measurement because the PL RS cannot be used to calculate the path loss (PL) of a SRS resource for a neighboring cell/TRP or a NR LMU that is not integrated with the serving cell. In particular, neighboring cells (TRPs in the neighboring cells) or NR LMUs in the coverage area of a neighboring cell are typically located farther than the serving cell with respect to the UE and, as a result, experience a larger PL. So, if the UE uses the PL RS that is configured and transmitted from the serving cell to also calculate the PL towards the neighboring cell/TRP or a NR LMU in the coverage area of a neighboring cell and then uses that calculated PL to determine the SRS transmit power towards the neighboring cell/TRP or a NR LMU in the coverage area of a neighboring cell, then the neighbor cell/TRP or a NR LMU in the coverage area of a neighboring cell may not receive the SRS with enough power to be able to detect and measure it. Solutions to this issue will be addressed below.

Problem 3: PC Adjustment Value Issue

If the UE is configured for physical uplink shared channel (PUSCH) transmissions and if higher layer parameter "srs-PowerControlAdjustmentStates" does not indicate separate power control adjustment states between SRS transmissions and PUSCH transmissions, the SRS power control adjustment state is the current PUSCH power control adjustment state. Note that PUSCH power is adjusted based on the requirement that it should be decodable at the serving cell. This can be problematic for multi-cell SRS measurement because a power control adjustment is irrelevant to UL-based positioning when the SRS is measured by TRPs that do not belong to the serving cell or NR LMUs that are not integrated with the serving cell.

Currently SRS is not configured for a usage that includes UL-based positioning. To enable a UL-based positioning usage, the SRS should be measured by more than just the serving cell.

Other practical scenarios in addition to UL-based positioning, such as UL-based mobility, may benefit from the UE being able to effectively transmit SRS to cells other than only the serving cell.

According to some aspects of the present disclosure, it may be beneficial to utilize SRS for multi-cell SRS measurements for processes such as UL-based positioning or UL-based mobility, or both. SRS is currently configured for four different usages: 1) Beamforming, 2) Codebook-based transmission, 3) Non-codebook-based transmission, and 4) Antenna switching (for the purpose of DL CSI acquisition). SRS resources are grouped into SRS resource sets. SRS usage is resource set specific. However, some UE procedures and behaviors and SRS configurations are different for different usages. Solutions to this issue will be addressed below in example embodiments.

Some embodiments of the application pertain to UE behavior for UL-based positioning. For example, a particular UE behavior is related to determination of a SRS spatial domain transmission filter.

In NR, an UE may need to use a directional spatial domain transmission filter to beamform the uplink reference signal (UL RS) or an UL channel towards an intended destination. To facilitate a correct NR sounding reference signal (SRS) transmit beamforming, a reference signal for the SRS spatial domain transmission filter may be defined in NR specifications. In particular, the higher layer parameter spatialRelationInfo is introduced in the configuration of each SRS resource that contains an identifier (ID) of a reference SSB, or the ID of a reference CSI-RS, or the ID of a reference SRS along with the ID of its corresponding UL BWP. In some embodiments, if the UE is configured with the spatialRelationInfo containing the ID of a reference SSB, the UE may transmit the target SRS resource with the same spatial domain transmission filter used for the reception of the reference synchronization signal/Physical Broadcast Channel (SS/PBCH) block (SSB). In some embodiments, if the higher layer parameter spatialRelationInfo contains the ID of a reference CSI-RS, the UE may transmit the target SRS resource with the same spatial domain transmission filter used for the reception of the reference CSI-RS. In some embodiments, if the higher layer parameter spatialRelationInfo contains the ID of a reference SRS, the UE may transmit the target SRS resource with the same spatial domain transmission filter used for the transmission of the reference SRS. Because the intended receiver in all current NR SRS usages is a serving cell, the reference SSB or CSI-RS for the SRS spatial domain transmission filter is configured and transmitted from the serving cell and, as such, the UE uses the ID of such SSB or CSI-RS to detect the SSB or CSI-RS.

A potential issue with the above arrangement for the positioning usage is that, unlike the current NR SRS usages, SRS for positioning may need to be received by network nodes other than a serving cell, namely, non-serving cells, gNBs, NR location measurement units (LMUs), or combinations thereof. In general, to determine an appropriate SRS spatial domain transmission filter, the UE should receive the reference signal for the SRS spatial domain transmission filter from the same direction as that of the SRS intended destination. Therefore, in some embodiments, the UE is configured to receive a reference signal for SRS spatial domain transmission filter that is sent from non-serving cells or NR LMUs, or both. Some embodiments of the disclosure provide for configuring of an UE so as to receive a reference signal for a SRS spatial domain transmission filter that is sent from non-serving cells or NR LMUs, or both.

Another particular UE behavior is related to determination of SRS transmission power. In some scenarios, a UE obtains a downlink pathloss estimate and can use it to calculate a NR SRS transmission power. The UE estimates the downlink pathloss from a configured higher layer SRS resource set-specific parameter pathlossReferenceRS which contains either the ID of a pathloss reference SSB or the ID of a pathloss reference CSI-RS. The intended receiver in current NR SRS usages is a serving cell. The pathloss reference SSB or pathloss reference CSI-RS is configured and transmitted from the serving cell and, therefore, the UE uses the ID of such SSB or CSI-RS to detect the SSB or CSI-RS. As the serving cell is likely to be closer to the UE than a non-serving cell, if the above downlink pathloss estimate is used to transmit positioning SRS that is meant to be measured at any of a non-serving cell, gNB or a NR LMU, the SRS received power may be too small to be detectable at the intended destination. A simple solution to this problem may be transmitting such SRS resource sets with a maximum allowed power. However, such a solution may result in both UE power overconsumption and an elevated UL inter-cell interference. A more efficient solution to this problem is to support a UE configuration to receive pathloss reference signals from other intended receivers, namely, non-serving cells and/or NR LMUs. The pathloss estimate based on such a pathloss reference signal can then be used to transmit SRS with an appropriate power towards the intended destination. Note that, in principle, the same SSB or CSI-RS reference signal configured for the SRS spatial domain transmission filter may also be used as the SRS pathloss reference signal. Some embodiments of the disclosure provide for configuring of a UE to receive a SRS pathloss reference signal that is sent from non-serving cells or NR LMUs, or both.

Current NR SRS procedures do not contemplate the positioning or mobility usage scenarios. Aspects of the present disclosure provide methodologies for adapting SRS measurement procedures for such scenarios.

FIGS. 1, 2, 3A and 3B following below provide context for the network and devices that may be in the network and that may implement aspects of the present disclosure.

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, multicast, unicast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission and receive point (TRP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more orthogonal or non-orthogonal channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA) or both. Alternatively, a base station 170a-170b may establish an air interface 190 with Evolved UTMS Terrestrial Radio Access (E-UTRA) using LTE, LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP) and user datagram protocol (UDP). EDs 110a-110c may be multimode devices capable of operation according to multiple radio access technologies, and incorporate multiple transceivers necessary to support such.

It is contemplated that the communication system 100 as illustrated in FIG. 1 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds or removes TRPs to from the NR cell.

It is obviously understood that any number of NR cells may be implemented in the communication system 100. For example, FIG. 2 illustrates two neighboring NR cells in an example communication system, in accordance with an embodiment of the present disclosure.

Figure 2:
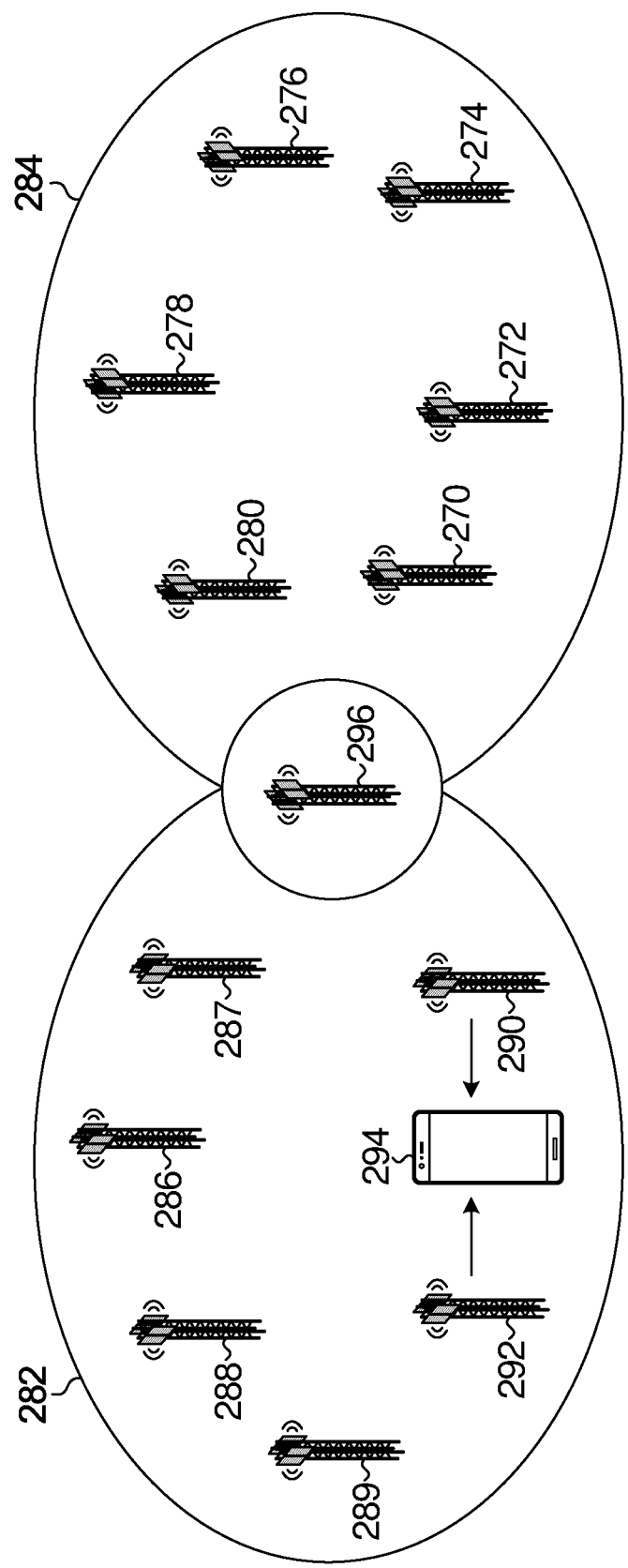
FIG. 2 illustrates two neighboring New Radio (NR) cells of an example communication system in which embodiments of the present disclosure could be implemented.

As illustrated in FIG. 2, NR cells 282, 284 each includes multiple TRPs that are assigned a same NR cell ID. For example, NR cell 282 includes TRPs 286, 287, 288, 289, 290, and 292, where TRPs 290, 292 communicates with an ED, such as UE 294. It is obviously understood that other TRPs in NR cell 282 may communicate with UE 294. NR cell 284 includes TRPs 270, 272, 274, 276, 278, and 280. TRP 296 is assigned to NR cells 282, 284 at different times, frequencies or spatial directions and the system may switch the NR cell ID for transmit point 296 between the two NR cells 282 and 284. It is contemplated that any number (including zero) of shared TRPs between NR cells may be implemented in the system.

In one embodiment, the system dynamically updates the NR cell topology to adapt to changes in network topology, load distribution, and/or UE distribution. In some implementations, if the concentration of UEs increases in one region, the system may dynamically expand the NR cell to include TRPs near the higher concentration of UEs. For example, the system may expand the NR cell to include other TRPs if the concentration of UEs located at the edge of the NR cell increases above a certain threshold. As another example, the system may expand the NR cell to include a greater concentration of UEs located between two hyper cells. In some implementations, if the traffic load increases significantly at one region, the system may also expand the NR cell associated with the region to include TRPs for the increased traffic load. For example, if the traffic load of a portion of the network exceeds a predetermined threshold, the system may change the NR cell ID of one or more TRPs that are transmitting to the impacted portion of the network.

In another embodiment, the system may change the NR cell ID associated with TRP 296 from the NR cell ID of NR cell 282 to the NR cell ID of NR cell 284. In one implementation, the system can change the association of a TRP with different NR cells periodically, such as every 1 millisecond. With such a flexible NR cell formation mechanism, all UEs can be served by the best TRPs so that there are substantially no UEs that are considered to be at a cell edge.

In yet another embodiment, the shared TRP 296 can reduce interference for UEs located at the boundary between the two NR cells 282, 284. UEs that are located near the boundaries of two NR cells 282, 284 experience less handovers because the shared TRP is associated with either NR cell at different times, frequencies or spatial directions. Further, as a UE moves between the NR cells 282, 284, the transition is a smoother experience for the user. In one embodiment, the network changes the NR cell ID of the TRP 296 to transition a UE moving between NR cells 282, 284.

The system may apply TRP selection techniques to minimize intra-NR cell interference and inter-NR cell interference. In one embodiment, a TRP sends a downlink channel state information (CSI)-reference symbol (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network, such as a controller, may select the best TRPs for all served UEs based on the downlink measurements. In another embodiment, a TRP detects an uplink sounding reference signal (SRS) sequence from a UE in the configured time-frequency resources. For example, Constant Amplitude Zero Auto Correlation (CAZAC) sequences such as Zadoff-Chu (ZC) sequences can be used as base sequences for SRS. The TRP reports a measurement of the detected uplink SRS sequence to the network, such as a controller. The controller then selects the optimal TRPs for all served UEs based on the measurements.

Figure 3A:
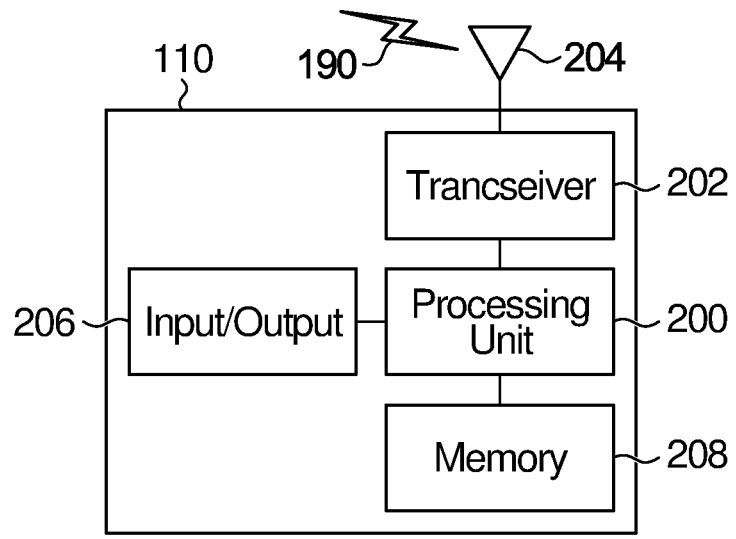
FIGS. 3A and 3B are block diagrams of an example electronic device (ED) and base station, respectively, that may implement the methods and teachings according to this disclosure.
Figure 3B:
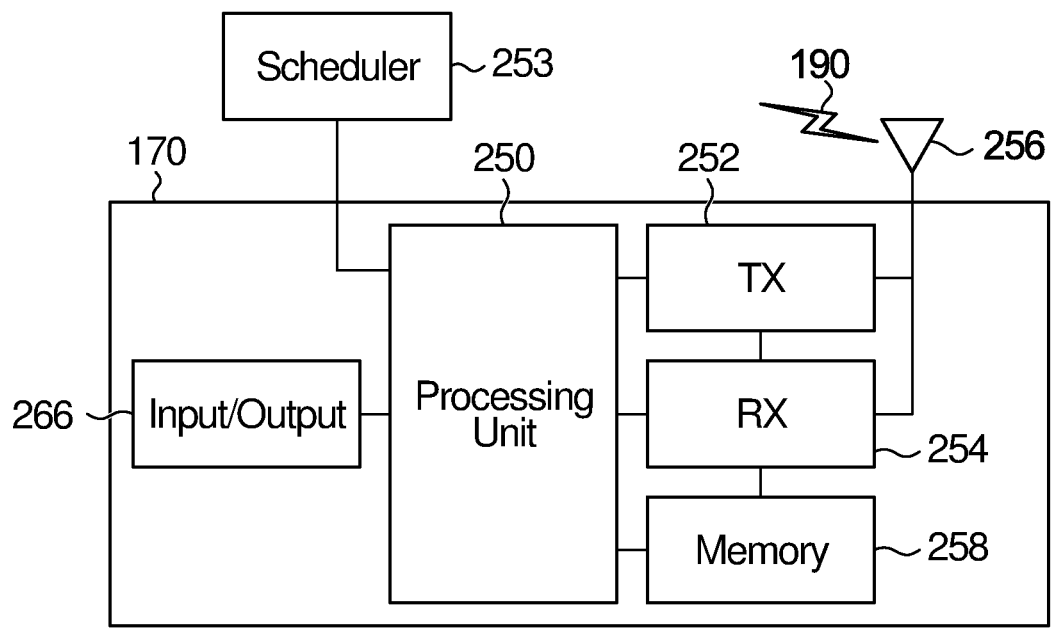

FIGS. 3A and 3B illustrate example devices that may implement the methods and teachings according to this disclosure. In particular, FIG. 3A illustrates an example ED 110, and FIG. 3B illustrates an example base station 170. These components could be used in the system 100 or in any other suitable system.

As shown in FIG. 3A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the communication system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or Network Interface Controller (NIC) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110. One or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 permit interaction with a user or other devices in the network. Each input/output device 206 includes any suitable structure for providing information to or receiving information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 permits interaction with a user or other devices in the network. Each input/output device 266 includes any suitable structure for providing information to or receiving/providing information from a user, including network interface communications.

Figure 4:
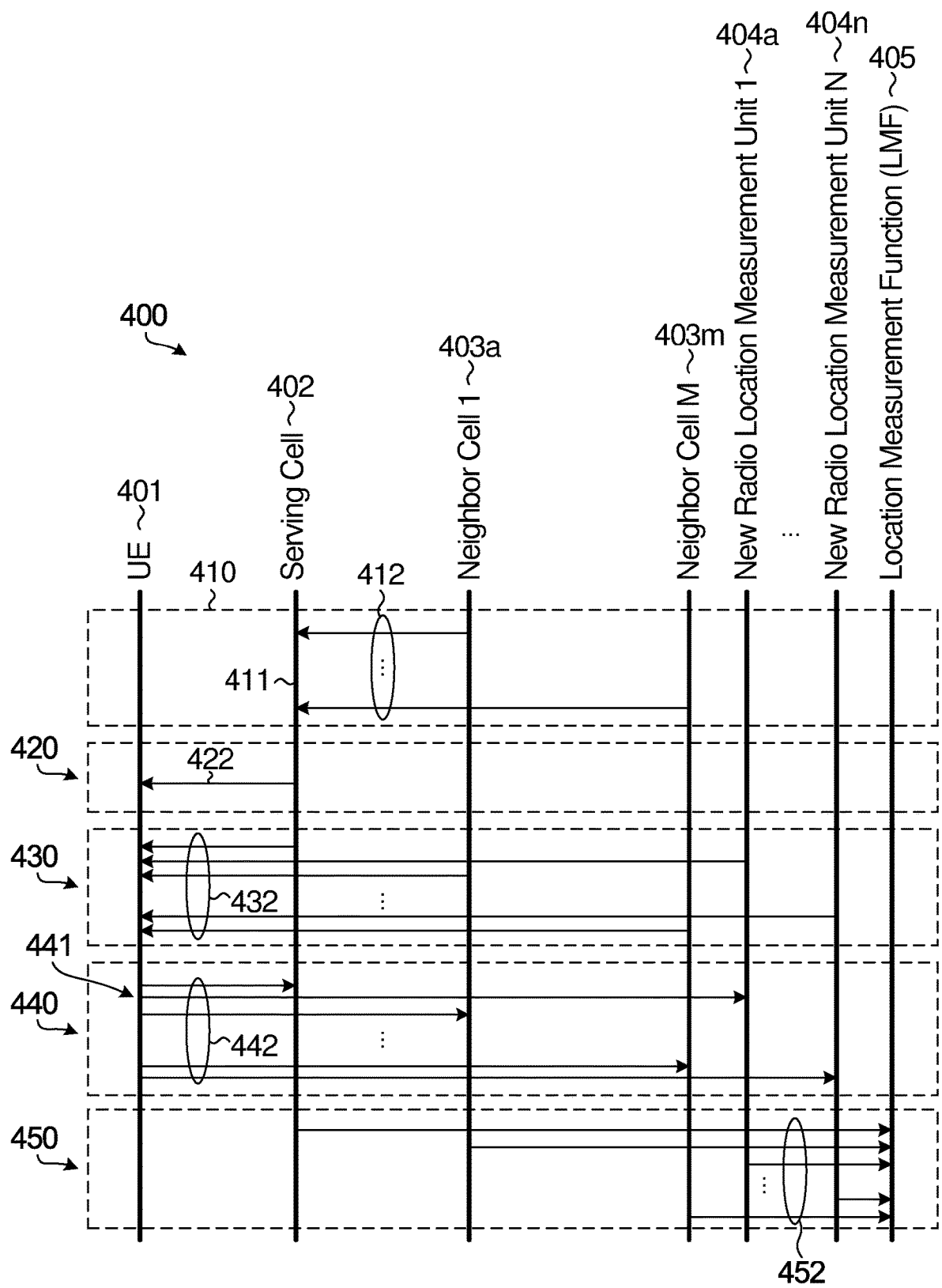
FIG. 4 is an example signal flow diagram according to an embodiment of the present disclosure.

FIG. 4 illustrates an example signal flow diagram 400 that describes how multi-cell SRS measurement can be performed for a TF RS or a PL TR, or both, in accordance with an aspect of this disclosure.

The signal flow diagram 400 includes signaling performed by a UE 401, a transmit receive point (TRP) in a serving cell 402, i.e. the cell that is serving the UE, TRPs in M neighbor cells (only Neighbor Cell 1 403a and Neighbor Cell M 403m shown), NR location measurement units (NR LMUs) in the coverage area of the serving cell or neighboring cells where each cell may have zero, one, or more NR LMU in the cell coverage area (only NR LMU 1 404a and NR LMU N 404n shown), and a location measurement function (LMF) node 405. Examples of LMF include location NR LMF, LTE LMF, or Enhanced Serving Mobile Location Center (E-SMLC). Within the coverage area of each cell, serving or neighbor, there may be zero, one or multiple NR location measurement units (NR LMUs). A NR LMU may be integrated with the cell or a TRP of the cell (i.e., geographically located on the same site) or may share antennas with the cell or a TRP of the cell or may have a different location than a cell site/TRP. A NR LMU can also transmit a TF RS or a PL RS and receive the SRS from the UE in a similar manner as the TRPs in the serving cell or neighbor cell and be used in determining the position of the UE. However, in general, the NR LMU does not configure any RS such as TF RS, PL RS, or SRS and cannot communicate with the UE through a control channel such as PDCCH or PUCCH or a data channel. To enable the NR LMU to transmit TF RS or PL RS or receive SRS, the corresponding RS configuration should be sent to the NR LMU from another network entity.

Within a first time frame 410 (denoted by a dashed line block), the serving cell 402 may configure 411 a TF RS per SRS resource or a PL RS per SRS resource set, or both. Note that each SRS resource set is comprised of at least one SRS resource. Also, at least one of the M neighbor cells, may configure a TF RS per SRS resource or a PL RS per SRS resource set, or both, either without any coordination with the serving cell or in a coordination with the serving cell. In one configuration, the neighbor cell(s) sends the SRS resource sets configurations 412 that include the configurations of the TF RSs and PL RSs to the serving cell 402, which is in communication with the UE, using backhaul between the serving cell and neighbor cells.

Within a second time frame 420, the serving cell 402 that is in communication with the UE sends 422 the configurations of the SRS Resource sets for the serving cell 402 and any of the neighbor cells 403a-403m that provided configuration information to the serving cell 402 to communicate to the UE 401.

Within a third time frame 430, the serving cell 402 and the neighboring cells 403a-403m and the NR LMUs 404a-404n transmit 432 the configured TF RS or PL RS, or both, to the UE 401. The TRPs in the serving cell 402 and/or the neighboring cells 403a-403m and/or the NR LM Us 404a-404n, may send the TF RS in multiple beam directions. Since the UE 401 has received 422 the TF RS or PL RS configuration beforehand in time frame 420, the UE 401 is able to detect the DL PL RS and DL TF RS beam(s) that is (are) transmitted from the serving cell 402, neighbor cell 403a-403m or NR LMUs 404a-404n. To detect each DL TF RS or DL PL RS, or both, the UE 401 typically uses spatial domain receive beam sweeping and determines which spatial domain receive beam is best to receive the DL TF RS from the serving cell 402, neighbor cell 403a-403m or NR LMU 404a-404n and then uses the same spatial domain receive beam as the spatial domain transmission beam of the SRS that is meant to be measured at that the serving cell 402, neighbor cell 403a-403m or NR LMU 404a-404n. The UE 401 may use UL/DL channel reciprocity in determining the spatial domain transmission filter.

Within a fourth time frame 440, the UE 401 uses the received TF RSs to obtain 441 the spatial transmission filter of the corresponding SRS resources and the PL RSs to determine 441 the transmit power of the corresponding SRS Resource sets and transmits 442 the SRS resource sets using the obtained transmission filters and transmit powers.

Within a fifth time frame 450, the TRPs of the serving cell 402 and the neighbor cells 403a-403m and the NR LMUs 404a-404n may send 452 the measurements that are obtained from the received SRSs to the LMF 405 to process and derive the position of the UE 401.

Each of the respective time frames shown in FIG. 4 are periods of time that are allotted within the communication network allowing the indicated signals to be transmitted and received. The signals in a respective time frame may be transmitted simultaneously, or sequentially, for the serving cell and the various neighbor cells and NR LMUs.

Spatial Domain Transmission Filter Reference Signal Configuration

A TF RS resource that is received by the UE to aid in determining the spatial domain transmission filter can be configured by higher layer signaling. The TF RS resource for SRS resource for positioning can be one of a SSB resource, a CSI-RS resource, or a SRS resource.

If the TF RS resource is a SSB or a CSI-RS resource, it may be transmitted from a serving cell, or a neighboring cell, or a NR LMU.

If the TF RS is a SRS resource, the TF RS configuration may follow existing procedures in the NR standard. Examples of when the TF RS is an SSB resource or a CSI-RS resource will be described in further detail below.

As described above with regard to the example of FIG. 4, the UE receives the TF RS resource configuration for the serving cell, neighbor cells or NR LMUs from the serving cell.

In some embodiments, different SRS resources in a same SRS resource set may have different TF RS resources.

The following section pertains to when the TF RS is a synchronization signal/Physical Broadcast Channel (SS/PBCH) block (SSB) resource.

The TF RS can be a part of an SRS Resource configuration (e.g., inside information element (IE) "SRS-Resource") or independently configured in a different IE.

In some embodiments, it is also possible that no TF RS is configured.

In some embodiments, the UE transmits the target SRS resource with the same spatial domain transmission filter that is used for the reception of the TF SSB.

In some embodiments, if the TF SSB is from a serving cell, the reference SSB can be configured by indicating the serving cell ID and SSB index to the UE using higher layer signaling.

Three examples will now be provided for a scenario in which the SSB resource is a TF RS. To differentiate between solutions regarding the transmission filter RS and power control RS that will be discuss in further detail below, the SSB resource in the following three examples will be referred to as TF-SSB.

Example 1—TF-SSB1

The following configuration parameters are provided to the UE using higher layer signaling:
- a TF SSB frequency location;
- a TF SSB subcarrier spacing
- a TF SSB index;
- a physical cell identifier (PCID) of the cell transmitting the TF SSB or the PCID of the cell that the NR LMU transmitting the TF SSB is within a coverage area thereof or the ID of the NR LMU transmitting the TF SSB; and
- a timing reference to obtain the time location of the TF SSB.

The TF SSB frequency location can be provided in one of the following formats:
- New Radio Absolute Radio Frequency Channel Number (NR-ARFCN) value;
- a relative location in a number of physical resource blocks (PRBs) or resource elements (REs) with respect to a target SRS resource location in a subcarrier spacing of the target SRS or SSB RS; and
- a relative location in number of PRBs or REs with respect to a SSB location that is used to obtain System Information in a subcarrier spacing of the target SRS or the SSB RS that is used to obtain System Information.

The system information, for example, is the information provided in a Master Information Block (MIB) or a System Information Block type 1 (SIB1).

The timing reference can be provided in one of the following formats:
- a timing of the serving cell in a same carrier frequency and with a same subcarrier spacing as the SSB RS;
- a timing of any detected cell in a same carrier frequency and with a same subcarrier spacing as the SSB RS;
- a timing of a primary cell (Pcell);
- a timing of a special cell (spCell) of a cell group that includes a serving cell that configures the target SRS resource;
- a timing of any serving cell in a same cell group as a serving cell that configures the target SRS resource; and
- a timing of an indicated serving cell.

Example 2—TF-SSB2

The following configuration parameters are provided to the UE using higher layer signaling:
- a TF SSB frequency location;
- a TF SSB subcarrier spacing
- a TF SSB index;
- a physical cell identifier (PCID) of the cell transmitting the TF SSB or the PCID of cell that the NR LMU transmitting the TF SSB is within a coverage area thereof or the ID of the NR LMU transmitting TF SSB; and
- a synchronization signal/Physical Broadcast Channel (SS/PBCH) block measurement timing configuration (SMTC) window indication including both periodicity and offset.

The time reference for the SMTC window may follow an existing NR mechanism such as that used in "MeasObjectNR".

The TF SSB frequency location can be provided in one of the following formats:
- p a NR-ARFCN value;
- a relative location in a number of PRBs or resource elements REs with respect to a target SRS resource location in a subcarrier spacing of the target SRS or SSB RS; and
- a relative location in number of PRBs or REs with respect to a SSB location that is used to obtain System Information in a subcarrier spacing of the target SRS or the SSB RS that is used to obtain System Information. As with example 1, the system information can be the information provided in Master Information block (MIB) or system information block type 1 (SIB1).

Example 3—TF-SSB3

In the third example, the parameters defining the TF SSB resource may be configured by using a known IE. A particular IE that may be of use is the "MeasObjectNR" IE. If using the "MeasObjectNR" IE, the fields of the IE can be completed based on the following:
- the same SSBFrequency as the NR-ARFCN of the TF SSB frequency and the same ssbSubcarrierSpacing as the subcarrier spacing of the TF SSB and indicate the TF SSB index in the ssb-ToMeasure;
- indicate the PCID of the cell transmitting the TF SSB or the PCID of cell that the NR LMU transmitting the TF SSB is within a coverage area thereof, which may be performed by adding the PCID of that cell in "cellsToAddModList" or indicate the ID of the NR LMU transmitting the TF SSB; and
- indicating that the TF SSB resource is for the purpose of determining the spatial domain transmission filter of the target SRS resource and the measurement does not need to be reported, which may be performed by adding a field to MeasObjectNR IE.

If the TF SSB is to be transmitted from a serving cell, the TF SSB can be alternatively configured using one of the above examples TF-SSB1, TF-SSB2, or TF-SSB3.

In some embodiments, the TF SSB may be configured, possibly by sending the configuration by one of TF-SSB1, TF-SSB2, or TF-SSB3 described above, but the UE cannot detect the TF SSB. If this occurs, the UE needs to use an alternative form of RS in order to determine the SRS spatial transmission filter and send out the SRS signal. Examples of several alternative RS are described below.

In a first alternative, the UE may use a detected SSB from the cell or NR LMU corresponding to the indicated TF SSB as the TF SSB. In a second alternative, if multiple SSBs of the cell or NR LMU are detected, the UE selects the SSB with a largest reference signal received power (RSRP) as the TF SSB. In a third alternative, the UE uses the SSB that is used to obtain System Information (MIB and/or SIB1) as the TF SSB. In a fourth alternative, it is up to the UE implementation how to transmit the corresponding SRS resource, for example, the UE may perform transmit beam sweeping. That is, the UE transmits different instances of the SRS resource in different beams. In a fifth alternative, the UE does not transmit the corresponding SRS Resource.

The following section pertains to when the TF RS is a channel state information reference signal (CSI-RS) resource.

The UE shall transmit the target SRS resource with the same spatial domain transmission filter used for the reception of the TF CSI-RS Resource. The spatial domain filter for the reception of the TF CSI-RS resource can be determined using prior knowledge, quasi-co-location type D (QCL-D) between the TF CSI-RS with an optionally indicated associated SSB, or through receive beam sweeping at the UE. The TF CSI-RS resource can be from a serving cell or a non-serving cell or a NR LMU. If the TF CSI-RS is from a serving cell, the TF CSI-RS for positioning SRS can be configured by indicating the serving cell ID and a TF CSI-RS Resource index to the UE using higher layer signaling.

Two examples will now be provided for a scenario in which the TF RS is a CSI-RS resource. To differentiate between solutions regarding the transmission filter RS and power control RS that will be discuss in further detail below, the CSI-RS resource in the following two examples will be referred to as TF-CSI-RS.

Example 1—TF-CSI-RS1

The following configuration parameters are provided to the UE using higher layer signaling:
  a reference frequency which is used for mapping of the TF CSI-RS resource on frequency domain;
  subcarrier spacing of the TF CSI-RS resource;
  a TF CSI-RS index;
  a physical cell identifier (PCID) of the cell transmitting the TF CSI-RS or the PCID of cell that the NR LMU transmitting the TF CSI-RS is within a coverage area thereof or the ID of the NR LMU transmitting TF CSI-RS;
  periodicity, which may be expresses in terms of milliseconds, or number of slots, or number of subframes;
  a timing reference to obtain the time location of the TF CSI-RS;
  a time offset, which may be expressed with respect to the timing reference;
  reference serving cell index;
  sequence ID; and
  parameters pertaining to resource mapping.

The reference frequency which is used for mapping of the TF CSI-RS resource on frequency domain can be provided in one of the following formats:
  New Radio Absolute Radio Frequency Channel Number (NR-ARFCN) value;
  Point A (subcarrier 0 in common resource block 0) of the cell that transmits the TF CSI-RS resource or the cell that the NR LMU transmitting the TF CSI-RS is within a coverage area thereof;
  Point A (subcarrier 0 in common resource block 0) of the serving cell that configures SRS resource; and
  the subcarrier 0 of the lowest resource block of the SRS Resource.

The timing reference can be derived from an associated SSB. The associated SSB can be transmitted from the same cell or NR LMU that transmits the TF CSI-RS resource or another cell or NR LMU. The timing reference can be alternatively provided in one of the following formats:
  a timing of any serving cell;
  a timing of a SpCell (such as primary cell (PCell) or a primary secondary cell (PSCell)); and
  a timing of an indicated reference serving cell.

The parameters pertaining to resource mapping include one or more of the following:
  density in terms of number of resource elements/physical resource blocks (RE/PRB);
  number of PRBs defining the bandwidth (BW) of the CSI-RS resource;
  start PRB with respect to reference frequency;
  frequency domain allocation pattern that determines the exact TF CSI-RS REs in each PRB within TF CSI-RS BW;
  symbol indices within the slot;
  number of ports;
  code divisional multiplexing (CDM)-type; and
  frequency band.

In some embodiments, the configuration information may include an associated SSB. In some embodiments, the configuration information includes an indication of whether or not the associated SSB is QCL-D with the TF CSI-RS resource.

In some embodiments, the associated SSB is configured, but may not be detected by the UE. In such a situation, the UE might not transmit the SRS resource corresponding to the TF CSI-RS resource. Alternatively, in such a situation, the UE determines the spatial domain receiving filter for the TF CSI-RS resource using, e.g., receive beam sweeping and use the so-obtained filter for the spatial domain transmission of SRS resource. In yet another alternative situation, it is up to the UE to determine how the UE will transmit the SRS resource for positioning. For instance, the UE may perform transmit beam sweeping. That is, the UE transmits different instances of the SRS resource in different beams.

Example 2—TF-CSI-RS2

In the second example, the parameters defining the TF CSI-RS resource may be configured by using a known IE. A particular IE that may be of use is the "MeasObjectNR" IE. If using the "MeasObjectNR" IE, the fields of the IE can be completed based on the following:
  the same "refFreqCSI-RS" as the Point A which is used for mapping of the TF CSI-RS resource to physical resources;
  configuring the TF CSI-RS resource in "csi-rs-ResourceConfigMobility" of MeasObjectNR
  indicating the PCID of the cell transmitting the TF CSI-RS resource or the PCID of cell that the NR LMU transmitting the TF CSI-RS is within a coverage area thereof, which may be performed by adding the PCID of that cell in "cellsToAddModList" or indicating the ID of the NR LMU transmitting the TF CSI-RS; and
  indicating that the TF CSI-RS resource is for the purpose of determining the spatial domain transmission filter of the target SRS resource and the measurement result does not need to be reported, which may be performed by adding a field to MeasObjectNR IE.

If the TF CSI-RS resource for positioning SRS is from a serving cell, the reference CSI-RS for positioning SRS can be alternatively configured using one of the above solutions TF-CSIRS1 or TF-CSIRS2.

In some embodiments, no TF RS is configured by higher layer signalling. Two examples will now be provided as solutions to such situations.

Example 1—TF-NoRS1

The PCID of a target cell or the ID of the target NR LMU is indicated to the UE and the UE may transmit a target SRS resource with a same spatial domain transmission filter that is used for detection of the SSB of the indicated cell or indicated NR LMU.

If no SSB of the target cell or NR LMU is detected, then one of the following UE behaviors is applicable:
  the UE does not transmit the SRS resource;
  the UE transmits the SRS resource using beam sweeping; or
  the UE behavior is left up to the UE to implement.

If multiple SSBs of the target cell or target NR LMU are detected, then:
  the UE considers the SSB with the largest RSRP as TF SSB; or
  the UE behavior is left up to the UE to implement.

If multiple SSBs of the target cell are detected and the target cell is a spCell, then the UE considers the SSB resource that is used to obtain System Information (MIB and/or SIB1) as TF SSB.

Example 2—TF-NoRS2

The PCID of a target cell or the ID of a target NR LMU is not indicated to the UE. In some embodiments, the UE transmits the SRS resource using beam sweeping. In alternative embodiments, the UE behavior is left up to the UE to implement.

Power Control Reference Signal Configuration

A pathloss (PL) RS resource that is received by the UE to aid in determining the transmission power for an SRS transmitted by the UE can be configured by higher layer signaling. The PL RS resource for SRS resource for positioning can be one of a SSB resource, a CSI-RS resource, or a SRS resource.

Solutions Power Control Mechanism—Resource Set Specific Power Control

In some embodiments, multiple SRS resource sets can be configured for each configured UL BWP for a UE. Each of the NR LMUs or TRPs or cells measures SRS resource(s) of at least one SRS resource set transmitted by the UE. Each configured SRS resource set includes one or multiple SRS resources. TRPs may belong to one NR cell or multiple NR cells. NR LMUs may be integrated with the TRPs or NR cells or located separately within the coverage area of NR cells. These NR cells may be the UE's serving cells, non-serving (neighbor) cells or a combination of both.

The SRS Resource set configuration (e.g. "SRS-ResourceSet") may include a physical cell identifier (PCID) of a target NR Cell or the PCID of cell that the target NR LMU is within a coverage area thereof or the ID of the target NR LMU. At least one SRS Resource in this SRS Resource set is configured with the intention of being received by the target NR LMU or at least one TRP of the target NR cell. The transmit power is SRS resource set specific. Each SRS resource set is configured with at most one PL RS.

Figure 5:
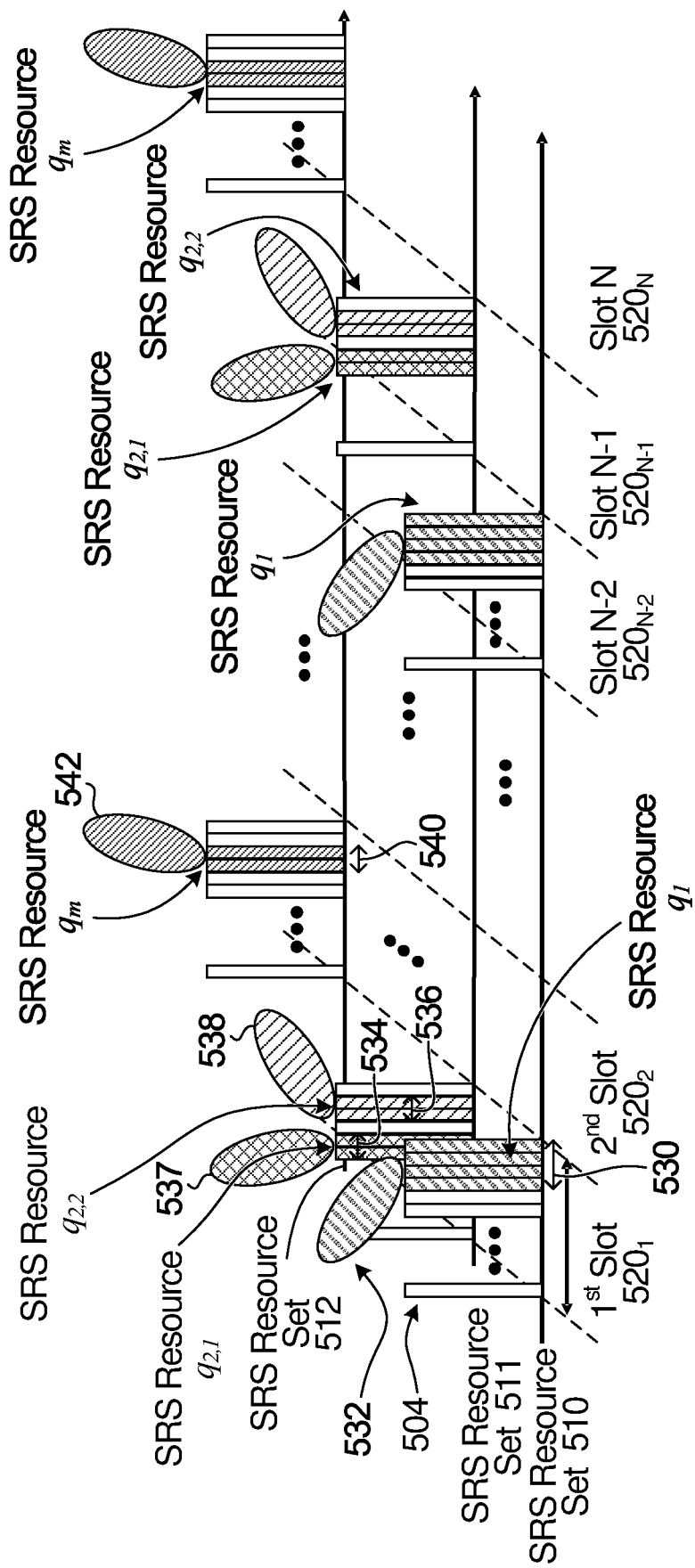
FIG. 5 is a schematic representation of an example of multiple resource sets being transmitted over multiple slots in accordance with an embodiment of the present application.

FIG. 5 illustrates an example of multiple (M) SRS resource sets that could be transmitted by a UE. FIG. 5 shows multiple (N) slots $520_1$ to $520_N$ each having one or more SRS resource sets. Each slot includes a set of symbols, which are represented as vertical bars, one of which is shown by reference character 504 In a first slot $520_1$, there are two SRS resource sets 510, 511. In a first SRS resource set 510, the only SRS resource $q_1$ is located in the final four symbols 530 of the slot $520_1$. Above the four symbols 530 is an image of a beam formed signal 532 representative of a directionality for transmission. In a second SRS resource set $q_2$, there are two SRS resources, a first SRS resource $q_{2,1}$ is two symbols 534 near the end of the slot $520_1$ and a second SRS resource $q_{2,2}$ is two symbols 536 even closer to the end of the slot $520_1$. Above each of the pairs of symbols is an image of a beam formed signal 537,538 representative of a directionality for transmission of that resource. It can be seen that each of the SRS resources $q_{2,1}$, $q_{2,2}$ has a beam formed signal with a different directionality. In a second slot $520_2$, there is a third SRS resource set 512 that is comprised of only one SRS resource $q_m$ that includes two symbols 540 in the slot $520_2$ having yet another different beam formed directionality 542. Slot N-2 $520_{N-2}$ includes a repetition of SRS resource $q_1$. Slot N-1 $520_{N-1}$ includes a repetition of SRS resources $q_{2,1}$ and $q_{2,2}$. Slot N $520_N$ includes a repetition of SRS resource $q_m$.

Solutions for Power Control Mechanism—PL RS Issue

For all SRS Resources of each SRS resource set, one PL RS resource (PathlossReferenceRS in RAN 38.331) that is received from a serving cell, neighbor cell or a NR LMU is used to calculate path loss.

Each SRS resource set used by the UE is comprised of one or multiple SRS resources.

In some embodiments, the PL RS resource is configured by higher layer signaling. A configured PL RS resource can be either a SSB resource or a CSI-RS resource.

A configured PL RS resource is configured and transmitted from a serving cell or a non-serving cell, but such configuration is sent to the UE only by the serving cell. The PL RS resource may also be transmitted from a NR LMU.

In some embodiments, the PL RS resource is not configured at all. If the PL RS resource is not configured, the manner in which the UE calculates PL may be dependent upon an alternative reference signal. This will be discussed in further detail below.

If the PL RS Resource is transmitted from the serving cell, the PL RS Resource can be configured by indicating RS index (SSB index or CSI-RS index) using higher layer signaling. This is similar to the current mechanism in NR.

As shown in FIG. 4, the UE receives the PL RS resource configuration from the serving cell in time frame 420.

In some embodiments, the PL RS resource is a part of the SRS Resource set configuration (e.g., inside "SRS-ResourceSet"). In some embodiments, the PL RS resource is configured independently in a different IE.

The following section pertains to when the PL RS is a synchronization signal/Physical Broadcast Channel (SS/PBCH) block (SSB) resource.

The PL RS can be a part of an SRS Resource set configuration (e.g., inside information element (IE) "SRS-Resource") or independently configured in a different IE.

Four examples will now be provided for a scenario in which the SSB resource is PL RS.

Example 1—PL-SSB1

The following configuration parameters are provided to the UE using higher layer signaling:
  a PL SSB frequency location;
  a PL SSB subcarrier spacing;
  a PL SSB index;

a physical cell identifier (PCID) of the cell transmitting the PL SSB or a cell that the NR LMU transmitting the PL SSB is within a coverage area thereof or the ID of the NR LMU transmitting PL SSB; and a timing reference to obtain the time location of the PL SSB.

The PL SSB frequency location can be provided in one of the following formats:

a NR-ARFCN value;

a relative location in a number of PRBs or resource elements REs with respect to a SSB location that is used to obtain System Information in a subcarrier spacing of the target SRS or the SSB RS that is used to obtain System Information.

The System Information, for example, is the information provided in a Master Information block (MIB) or a System Information Block type 1 (SIB1).

The timing reference can be provided in one of the following formats:

a timing of the serving cell in a same carrier frequency and with a same subcarrier spacing as the SSB RS;

a timing of any detected cell in a same carrier frequency and with a same subcarrier spacing as the SSB RS;

a timing of a primary cell (Pcell);

a timing of a special cell (spCell) of a cell group that includes a serving cell that configures the target SRS resource;

a timing of any serving cell in a same cell group as a serving cell that configures the target SRS resource; and a timing of an indicated serving cell.

Example 2—PL-SSB2

The following configuration parameters are provided to the UE using higher layer signaling:

a PL SSB frequency location;

a PL SSB subcarrier spacing;

a PL SSB index;

a physical cell identifier (PCID) of the cell transmitting the PL SSB or a cell that the NR LMU transmitting the PL SSB is within a coverage area thereof or the ID of the NR LMU transmitting PL SSB; and a synchronization signal/Physical Broadcast Channel (SS/PBCH) block measurement timing configuration (SMTC) window indication including both periodicity and offset.

The time reference for the SMTC window may follow an existing NR mechanism such as that used in "MeasObjectNR".

The PL SSB frequency location can be provided in one of the following formats:

a NR-ARFCN value; and a relative location in number of PRBs or REs with respect to a SSB location that is used to obtain System Information in a subcarrier spacing of the target SRS or the SSB RS that is used to obtain System Information. As with example 1, the System Information can be the information provided in the Master Information Block (MIB) or System Information Block type 1 (SIB1).

Example 3—PL-SSB3

In the third example, the PL SSB may be configured by using a known IE. A particular IE that may be of use is the "MeasObjectNR" IE. If using the "MeasObjectNR" IE, the fields of the IE can be completed based on the following:

the same "SSBFrequency" as the NR-ARFCN of the PL SSB frequency and the same "ssbSubcarrierSpacing" as the subcarrier spacing of the PL SSB and indicate the PL SSB index in the "ssb-ToMeasure";

indicating the PCID of the cell transmitting the PL SSB or the cell that the NR LMU transmitting the PL SSB is within a coverage area thereof, which may be performed by adding the PCID of that cell in "cellsToAddModList"; or indicating the ID of the NR LMU transmitting the PL SSB and indicating that the PL SSB resource is for the purpose of determining the PL used to calculate the transmission power of the a target SRS resource set and does not need to be reported, which may be performed by adding a field to "MeasObjectNR IE".

Example 4—PL-SSB4

A TF SSB configured using TF-SSB1 or TF-SSB2 or TF-SSB3 for determining the spatial domain transmission filter of one of the SRS Resources in this SRS Resource set may additionally be used as the PL SSB of the SRS Resource Set.

A field in the TF SSB configuration can indicate such an additional usage.

If the PL SSB is to be transmitted from a serving cell, the PL SSB can be alternatively configured using one of the above examples PL-SSB1, PL-SSB2, PL-SSB3, or PL-55B4.

In some situations the PL SSB may be configured, possibly by sending the configuration by one of PL-SSB1, PL-55B2, PL-55B3, or PL-SSB4 described above, but the UE cannot detect the PL SSB. If this occurs, the UE needs to use an alternative form of RS in order to send out the SRS signal. Examples of several alternative RS are described below.

In a first alternative, the UE may use a detected SSB from the cell or NR LMU corresponding to the indicated PL SSB as the PL SSB. In a second alternative, if multiple SSBs of the cell or NR LMU are detected, the UE selects the SSB with a largest reference signal received power (RSRP) as the PL SSB. In a third alternative, if multiple SSBs of the above cell or NR LMU are detected, it is up to the UE to determine how to calculate the PL based on a received power from the detected SSBs of the cell or NR LMU. In a fourth alternative, the UE uses the SSB that is used to obtain System Information (MIB and/or SIB1) as the PL SSB. In a fifth alternative, the UE uses the PL SSB of the SRS Resource set that is configured for the serving cell (e.g., PCID of the serving cell is included in the SRS Resource set configuration SRS-ResourceSet) as the PL SSB of this SRS Resource set. In a sixth alternative, it is up to the UE to determine how to transmit the corresponding SRS resource, for example, the UE may perform transmit beam sweeping. That is, the UE transmits different instances of the SRS resource in different beams. In a seventh alternative, the UE does not transmit the corresponding SRS Resource.

The following section pertains to when the PL RS is a channel state information reference signal (CSI-RS) resource. When the PL RS is a CSI-RS resource from a non-serving cell or an NR LMU, the spatial domain filter for the reception of PL CSI-RS resource may be determined using: prior knowledge; a quasi co-location type D (QCL-D) relationship between the PL CSI-RS resource and an optionally indicated associated SSB; a QCL-D relationship between the PL CSI-RS resource and another known DL RS; or through receive beam sweeping at the UE.

Three examples will now be provided for a scenario in which the PL RS is a CSI-RS resource.

Example 1—PL-CSI-RS1

The following configuration parameters are provided to the UE using higher layer signaling:
- a reference frequency which is used for mapping of the PL CSI-RS resource on frequency domain;
- subcarrier spacing of the PL CSI-RS resource;
- a PL CSI-RS index;
- a physical cell identifier (PCID) of the cell transmitting the PL CSI-RS resource or the PCID of cell that the NR LMU transmitting the PL CSI-RS is within a coverage area thereof or the ID of the NR LMU transmitting PL CSI-RS;
- periodicity, which may be expresses in terms of milliseconds, or number of slots, or number of subframes;
- a timing reference to obtain the time location of the PL CSI-RS;
- a time offset, which may be expressed with respect to the timing reference;
- reference serving cell index;
- sequence ID; and
- parameters pertaining to resource mapping.

The PL CSI-RS reference frequency location can be provided in one of the following formats:
- a NR-ARFCN value;
- Point A (subcarrier 0 in common resource block 0) of the cell that transmits the PL CSI-RS resource or the cell that the NR LMU transmitting the PL CSI-RS is within a coverage area thereof; and
- Point A (subcarrier 0 in common resource block 0) of the serving cell that configures SRS resource.

The timing reference can be derived from an associated SSB. The associated SSB can be transmitted from the same cell or NR LMU that transmits the PL CSI-RS resource or another cell or NR LMU. Alternatively, the timing reference can be provided in one of the following formats:
- a timing of any serving cell;
- a timing of a SpCell (such as primary cell (PCell) or a primary secondary cell (PSCell)); and
- a timing of an indicated reference serving cell.

The parameters pertaining to resource mapping include one or more of the following:
- density in terms of number of resource elements/physical resource blocks (RE/PRB);
- number of PRBs defining the bandwidth (BW) of the CSI-RS resource;
- start PRB with respect to reference frequency;
- frequency domain allocation pattern that determines the exact PL CSI-RS REs in each PRB within PL CSI-RS BW;
- symbol indices within the slot;
- number of ports;
- code divisional multiplexing (CDM)-type; and
- frequency band.

In some embodiments, the configuration information may include an associated SSB. In some embodiments, the configuration information includes an indication of whether or not the associated SSB is QCL-D with the PL CSI-RS resource.

In some situations, the associated SSB is configured, but may not be detected by the UE. In such a situation, the UE might not transmit the SRS resource corresponding to the PL CSI-RS resource. Alternatively, in such a situation, the UE determines the spatial domain receiving filter for the PL CSI-RS resource using, e.g., receive beam sweeping and calculates the path loss from the PL CSI-RS resource that is received using the so-obtained filter. In yet another alternative situation, the UE calculates the path loss using the PL RS that is transmitted from the serving cell (e.g. PL RS that is configured in a "SRS-ResourceSet" that carries the PCID of the serving cell). In still a further alternative situation, the UE calculates the path loss from the SSB that is used to obtain System Information (MIB and/or SIB1).

Example 2—PL-CSI-RS2

In the second example, the PL CSI-RS may be configured by using a known IE. A particular IE that may be of use is the "MeasObjectNR" IE. If using the "MeasObjectNR" IE, the fields of the IE can be completed based on the following:
- the same "refFreqCSI-RS" as the Point A which is used for mapping of the PL CSI-RS resource to physical resources;
- configuring the PL CSI-RS resource in "csi-rs-ResourceConfigMobility" of "MeasObjectNR";
- indicating the PCID of the cell transmitting the PL CSI-RS resource, which may be performed by adding the PCID of the cell transmitting the reference CSI-RS or the cell that the NR LMU transmitting the PL CSI-RS is within a coverage area thereof in "cellsToAddModList" or indicating the ID of the NR LMU transmitting the PL CSI-RS; and
- indicating that the PL CSI-RS resource is for the purpose of determining the path loss of the target SRS resource set and the measurement result does not need to be reported, which may be performed by adding a field to the "MeasObjectNR" IE.

Example 3—PL-CSI-RS3

A TF CSI-RS configured using TF-CSIRS1 or TF-CSI RS2 for determining the spatial domain transmission filter of one of the SRS Resources in the SRS Resource set may be used as the PL CSI-RS resource for the SRS Resource set. A parameter in TF CSI-RS resource configuration may be used to indicate such an additional usage.

If the PL CSI-RS resource for positioning SRS is from a serving cell, the reference CSI-RS can be alternatively configured using one of the above solutions PL-CSI-RS1, PL-CSIRS2, or PL-CSIRS3.

In some situations, no PL RS is configured by higher layer signalling. Alternatively, there may be a time period when the UE has not yet been provided dedicated higher layer parameters.

Two examples will now be provided as solutions to such situations.

Example 1—PL-NoRS1

The PCID of a target cell or the ID of the target NR LMU is indicated to the UE in the SRS Resource Set configuration and the UE may calculate the path loss from the SSB of the indicated cell or indicated NR LMU.

If no SSB of the target cell or target NR LMU is detected, then one of the following UE behaviors is applicable:
- the UE calculates the path loss from the SSB that is used to obtain System Information (MIB and/or SIB1);
- the UE calculates the path loss using the PL RS that is transmitted from the serving cell (e.g. PL RS that is configured in a "SRS-ResourceSet" that carries the PCID of the serving cell);

the UE does not transmit the corresponding SRS resource set; or the UE behavior is left up to the UE to implement.

If multiple SSBs of the target cell or target LMU are detected, then:

the UE considers the SSB with the largest RSRP as PL SSB; or the UE behavior is left up to the UE to implement.

If multiple SSBs of the target cell are detected and the target cell is a spCell, then the UE considers the SSB resource that is used to obtain System Information (MIB and/or SIB1) as the PL SSB.

Example 2—PL-NoRS2

The PCID of a target cell or the ID of a target NR LMU is not indicated to the UE. In some embodiments, the UE calculates the path loss from the SSB that is used to obtain System Information (MIB and/or SIB1). In some embodiments, the UE calculates the path loss using the PL RS that is transmitted from the serving cell (e.g. PL RS that is configured in a "SRS-ResourceSet" that carries the PCID of the serving cell). In some embodiments, the UE behavior is left up to the UE to implement.

Solutions for Power Control Mechanism—PC Adjustment Value Issue

For each SRS Resource set, one power adjustment function $h_{b,f,c}(i,l)$ may be used to tune the SRS Resource set transmit power.

In one example, if the SRS Resource set is configured for the serving cell (e.g., PCID of the serving cell is included in the SRS Resource set configuration "SRS-ResourceSet"), the current NR solution for calculating $h_{b,f,c}(i,l)$ can be used.

If the SRS Resource set is configured for a non-serving cell (e.g., PCID of a non-serving cell is included in the SRS Resource set configuration "SRS-ResourceSet") or if the SRS Resource set is configured for NR LMU, then one of the following solutions AD-1 or AD-2 can be used Example 1—AD-1

The same solution is used for calculating $h_{b,f,c}(i,l)$ regardless of whether or not the SRS Resource set is configured for a serving cell or a non-serving cell or NR LMU.

Example 2—AD-2

The value of $h_{b,j,c}(i,l)$ is calculated based on the following expression:

$$h_{b,f,c}(i,l) = \delta + (c-1) \times s.$$

where δ (dB) is a tuning value and s≥0 (dB) is a SRS power ramping step and are determined using higher layer signaling.

In one example, c increments by 1 at each SRS transmission until SRS power reaches $P_{CMAX,f,c}(i)$ or a power ramping suspension message is received from lower layers. In another example, c increments by one only if a power ramping message is received from lower layers. In another example, c resets to one if a power ramping reset message is received from lower layers.

Power ramping, power ramping suspension, and power ramping messages may be explicit or implicit.

As discussed above, NR SRS transmit power is determined using the following formula:

$$P_{SRS,b,f,c}(i, q_s, l) = \min \begin{cases} P_{CMAX,f,c}(i) \\ P_{o\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{cases}$$

The value of $PL_{b,f,c}(q_d)$ is determined using one of the solutions presented in "Solution to Problem 2: Pathloss RS issue" section above.

The value of $h_{b,f,c}(i,l)$ is determined using one of the solutions presented in "Solution to Problem 3: PC adjustment value" section above.

The values of other parameters are also described above.

Figure 6:
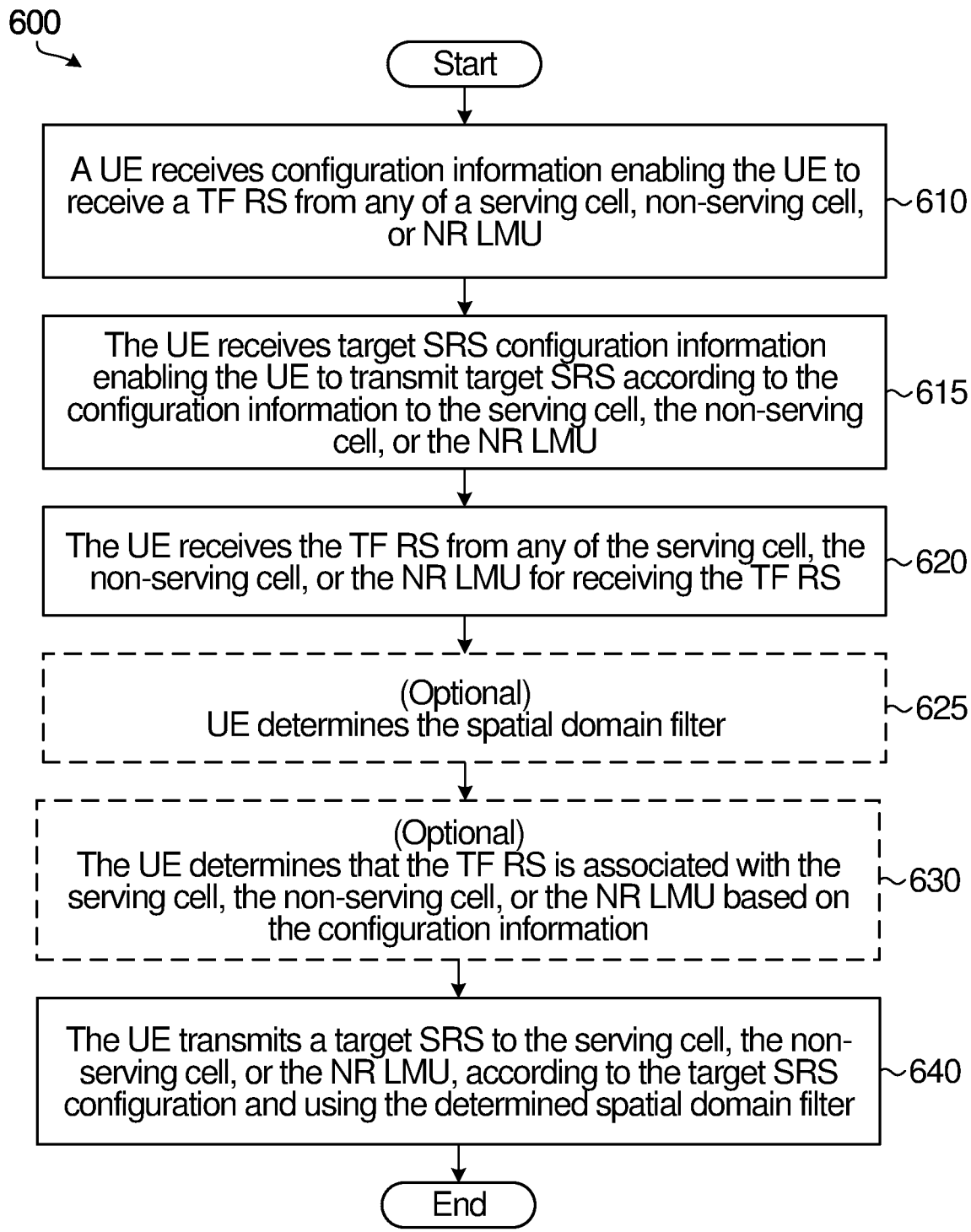
FIG. 6 is a flow chart illustrating an example of a method performed by a user equipment (UE) in accordance with an embodiment of the present application.

FIG. 6 is a flow chart 600 that illustrates steps in a method for sounding reference signal (SRS) measurement. At 610, a user equipment (UE) receives configuration information enabling the UE to receive a spatial domain transmission filter reference signal (TF RS) from any of a serving cell, non-serving cell, or location measurement unit (NR LMU). The configuration of the TF RSs may be sent to the UE by a serving cell or LMF. The serving cell, non-serving cell, and NR LMU are configured to transmit the TF RS to the UE and receive a SRS from the UE. At 615, the UE receives target SRS configuration information enabling the UE to transmit target SRS to any of the serving cell, the non-serving cell or the NR LMU, according to the configuration information. At 620, the UE receives the TF RS from any of the serving cell, the non-serving cell, or the NR LMU. At step 625, optionally the UE determines the spatial domain filter for receiving the TF RS. Optionally, at 630, the UE determines that the TF RS is associated with a particular serving cell, non-serving cell or NR LMU, based on the configuration information. At 640, the UE transmits a target SRS to the serving cell, the non-serving cell, or the NR LMU, according to the target SRS configuration and using the determined spatial domain filter.

Figure 7:
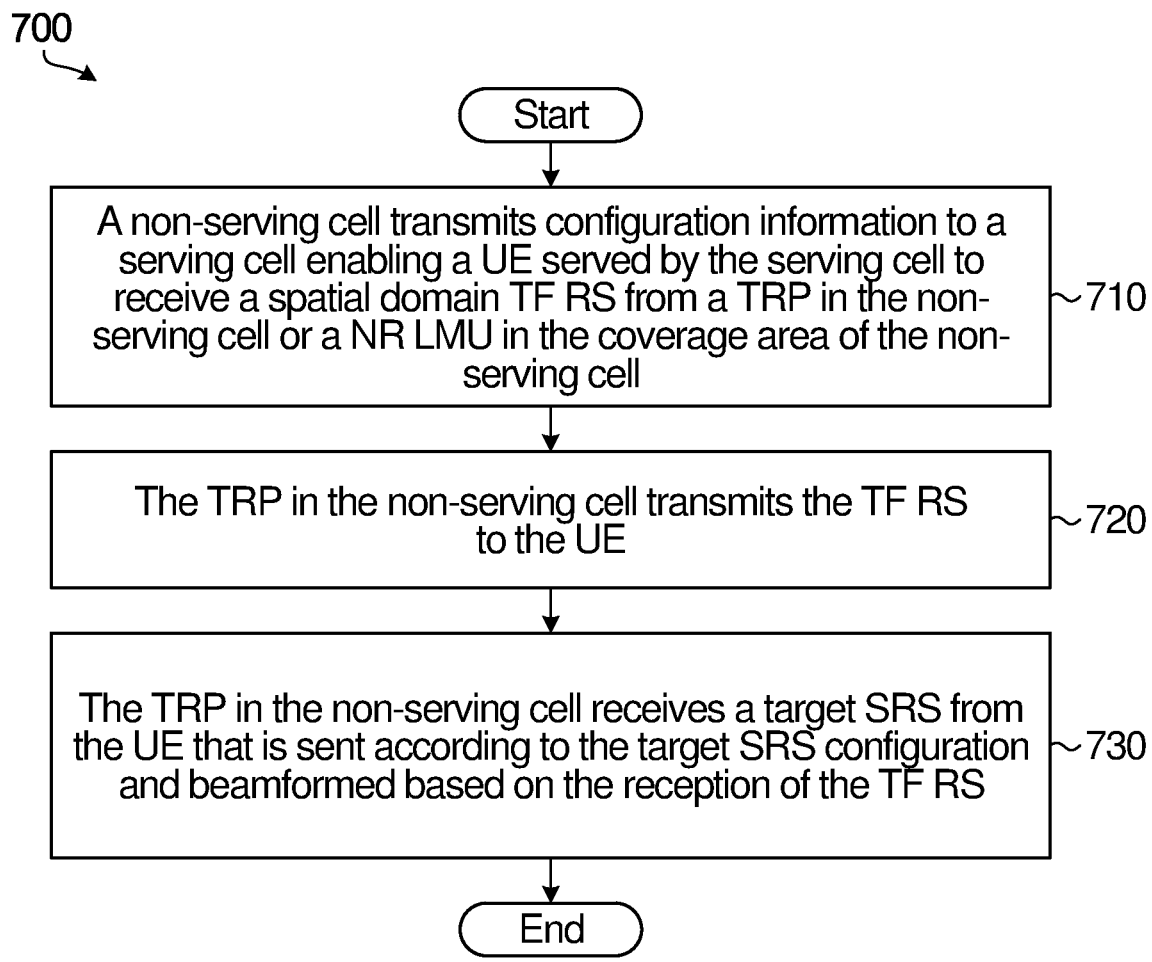
FIG. 7 is a flow chart illustrating an example of a method performed by a transmit receive point (TRP) in a serving cell in accordance with an embodiment of the present application.

FIG. 7 is a flow chart 700 that illustrates steps in a method for SRS measurement. At 710, a non-serving cell transmits configuration information to a serving cell enabling a UE served by the serving cell to receive a spatial domain TF RS from a TRP in the non-serving cell or a NR LMU in the coverage area of the non-serving cell. At 720, the TRP in the non-serving cell or the NR LMU in the coverage area of the non-serving cell transmits the TF RS to the UE. At 730, the TRP in the non-serving cell receives a target SRS from the UE that is sent according to the target SRS configuration and beamformed based on the reception of the TF RS (for example, as transmitted in 720).

Figure 8:
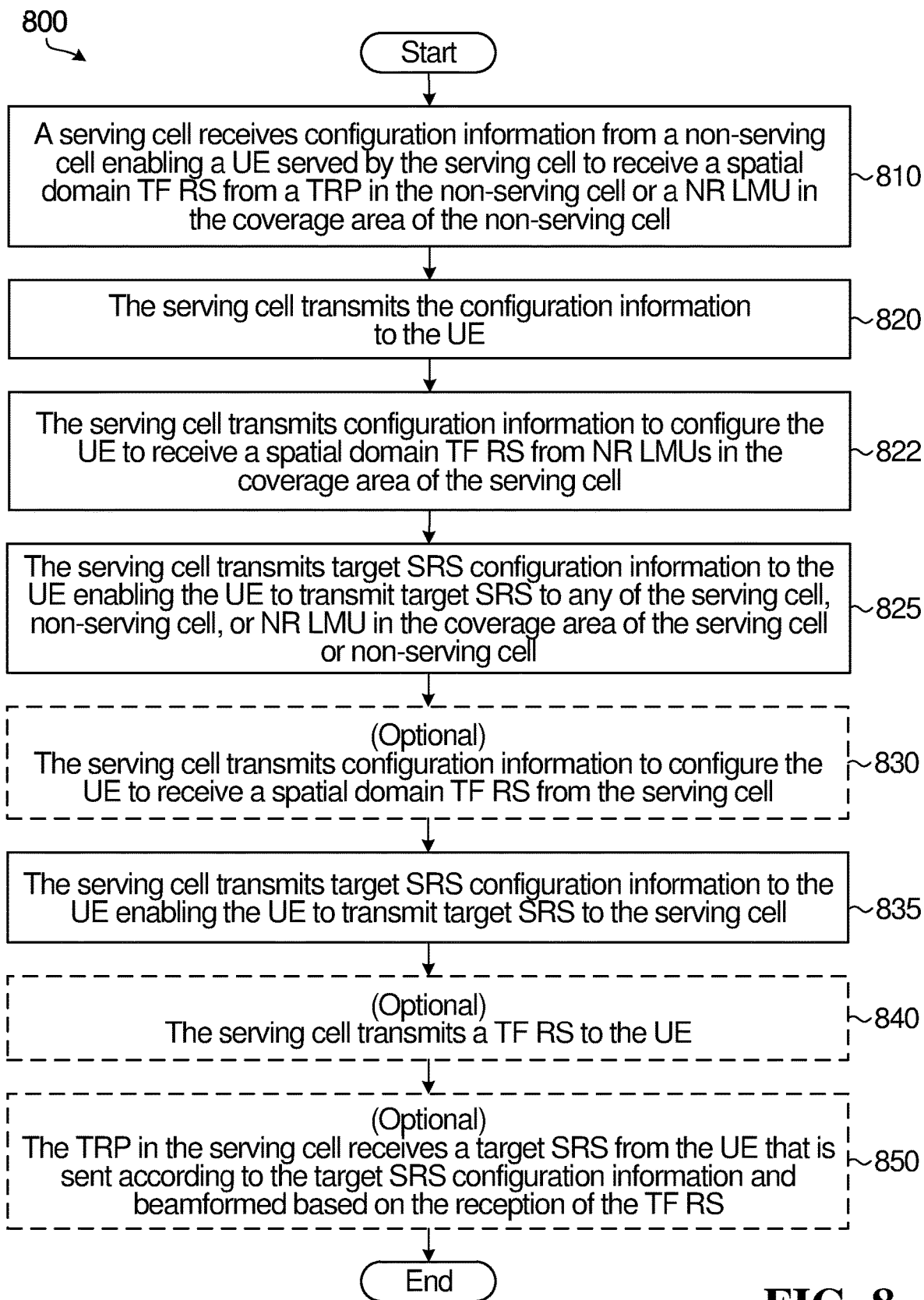
FIG. 8 is a flow chart illustrating an example of a method performed by a TRP in a non-serving cell in accordance with an embodiment of the present application.

FIG. 8 is a flow chart 800 that illustrates steps in a method for SRS measurement. In particular, the method involves a serving cell receiving configuration information from a TRP in a non-serving cell with information regarding a RS that is to be transmitted by the TRP in the non-serving cell or by an NR LMU in the coverage area of the non-serving cell. The serving cell passes the configuration information along to the UE. The serving cell may also optionally forward to the UE configuration information regarding the RS transmitted by the serving cell, transmit the RS and then receive the SRS resource for the serving cell from the UE. At 810, a serving cell receives configuration information from a non-serving cell enabling a UE served by the serving cell to receive a spatial domain TF RS from a TRP in the non-serving cell or a NR LMU in the coverage area of the non-serving cell. At 820, the serving cell transmits the received configuration information to the UE. At 822, the serving cell transmits configuration information to configure the UE to receive a spatial domain TF RS from NR LMUs in the coverage area of the serving cell. At 825, the serving cell transmits a target SRS configuration to the UE enabling the UE to transmit target SRS to any of the serving cell, the non-serving cell, or a NR LMU in the coverage area of the serving cell or non-serving cell. At 830, optionally, the serving cell transmits configuration information to configure the UE to receive a spatial domain TF RS from the serving cell. At 835, the serving cell transmits a target SRS configuration information to the UE enabling the UE to transmit the target SRS to the serving cell. At 840, optionally, the serving cell transmits a TF RS to the UE. At 850, optionally, the TRP in the serving cell receives a target SRS from the UE that is sent according to the target SRS configuration (for example as transmitted in 835) and beamformed based on the reception of the TF RS (for example as transmitted in 840).

Figure 9:
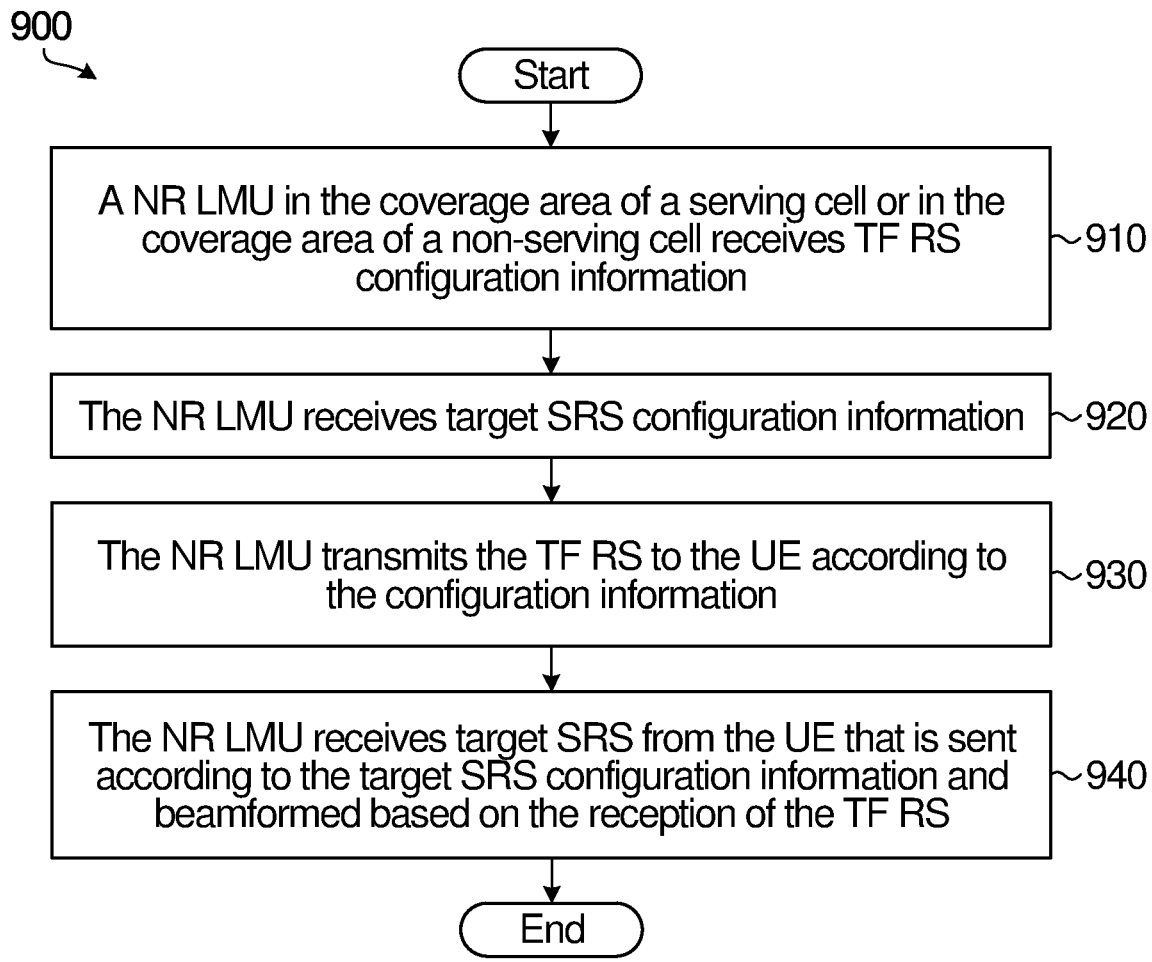
FIG. 9 is a flow chart illustrating an example of a method performed by a new radio location measurement unit (NR LMU) in a serving cell or a non-serving cell in accordance with an embodiment of the present application.

FIG. 9 is a flow chart 900 that illustrates steps in a method for sounding reference signal (SRS) measurement. At 910, a New Radio-Location Measurement Unit (NR LMU) in the coverage area of a serving cell or in the coverage area of a non-serving cell receives TF RS configuration information. At 920, the NR LMU receives target SRS configuration information. At 930, the NR LMU transmits the TF RS to the UE according to the configuration information (for example as received in 920). At 940, the NR-NR LMU receives target SRS from the UE that is sent according to the target SRS configuration and beamformed based on the reception of the TF RS (for example as transmitted in 930).

Figure 10:
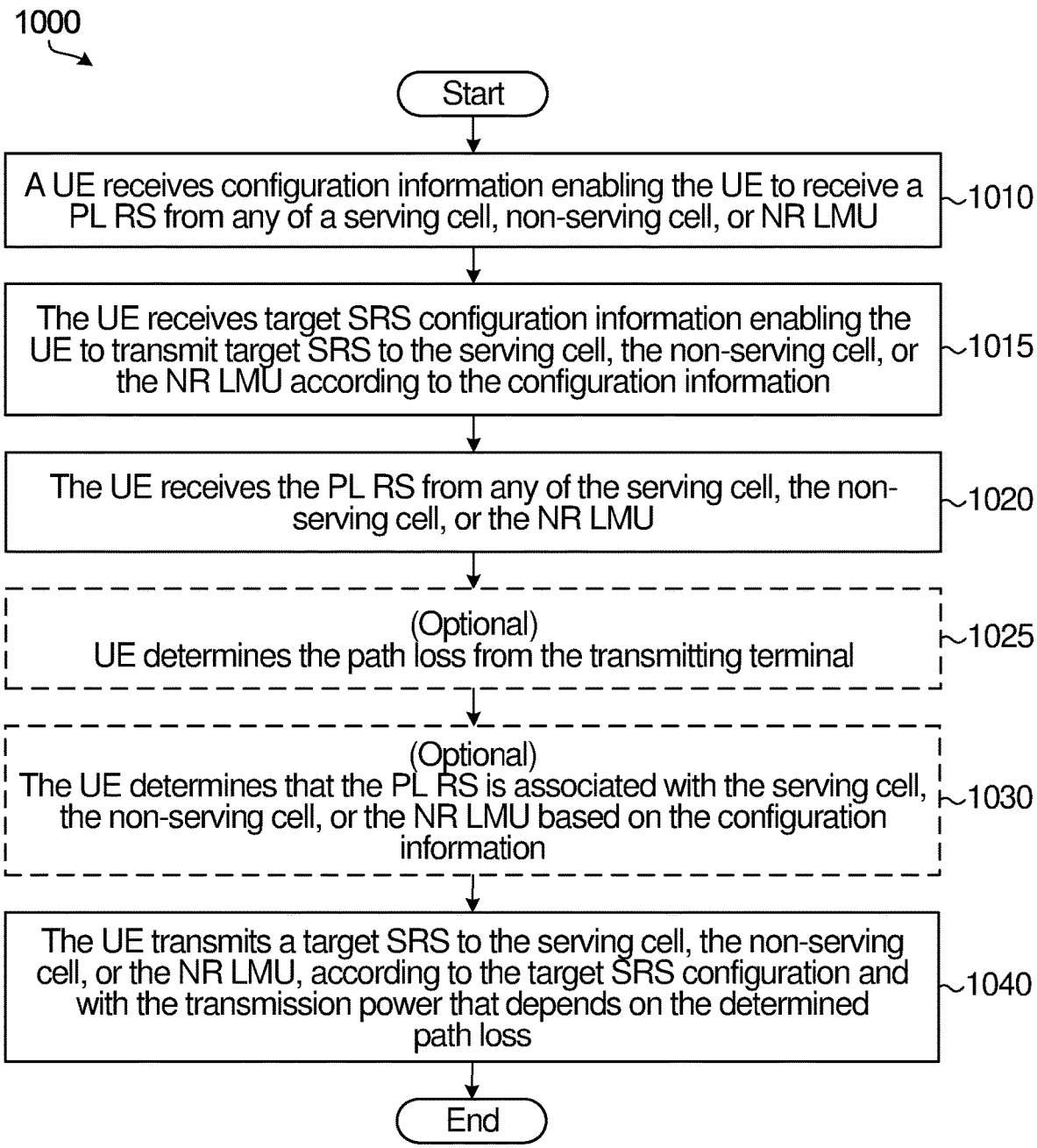
FIG. 10 flow charts illustrating an example of a method performed by a UE in accordance with another embodiment of the present application.

FIG. 10 is a flow chart 1000 that illustrates steps in a method for sounding reference signal (SRS) measurement. At 1010, a UE receives configuration information enabling the UE to receive a pathloss reference signal (PL RS) from any of a serving cell, non-serving cell, or NR LMU. The configuration of the PL RSs may be sent to the UE by a serving cell or LMF. The serving cell, non-serving cell, and NR LMU are configured to transmit the PL RS to the UE and receive a SRS from the UE. At 1015, the UE receives target SRS configuration information enabling the UE to transmit target SRS to any of the serving cell, the non-serving cell or the NR LMU according to the configuration information. At 1020, the UE receives the PL RS from any of the serving cell, the non-serving cell, or the NR LMU. At 1025, optionally, the UE determines the path loss from the transmitting terminal, i.e. the serving cell, the non-serving cell, or the NR LMU. Optionally, at 1030, the UE determines that the PL RS is associated with a particular serving cell, non-serving cell or NR LMU, based on the configuration information (for example as received in 1015). At 1040, the UE transmits a target SRS to the serving cell, the non-serving cell, or the NR LMU, according to the transmission power that depends on the determined path loss (for example in 1020).

Figure 11:
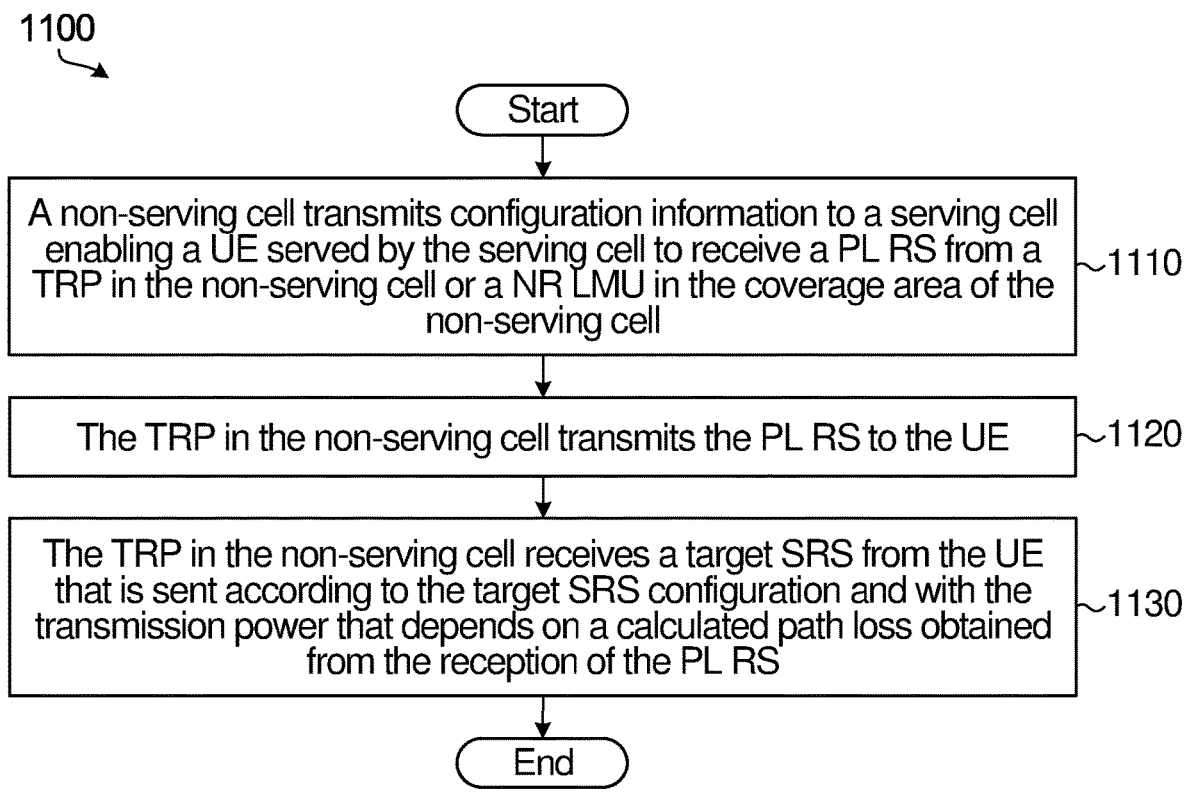
FIG. 11 is a flow chart illustrating an example of a method performed by a TRP in a serving cell in accordance with another embodiment of the present application.

FIG. 11 is a flow chart 1100 that illustrates steps in a method for SRS measurement. At 1110, a non-serving cell transmits configuration information to a serving cell enabling a UE served by the serving cell to receive a PL RS from a TRP in the non-serving cell or a NR LMU in the coverage area of the non-serving cell. At 1120, the TRP in the non-serving cell transmits the PL RS to the UE. At 1130, the TRP in the non-serving cell receives a target SRS from the UE that is sent according to the target SRS configuration and with the transmission power that depends on the calculated path loss obtained from the reception of the PL RS (for example, as transmitted in 1120).

Figure 12:
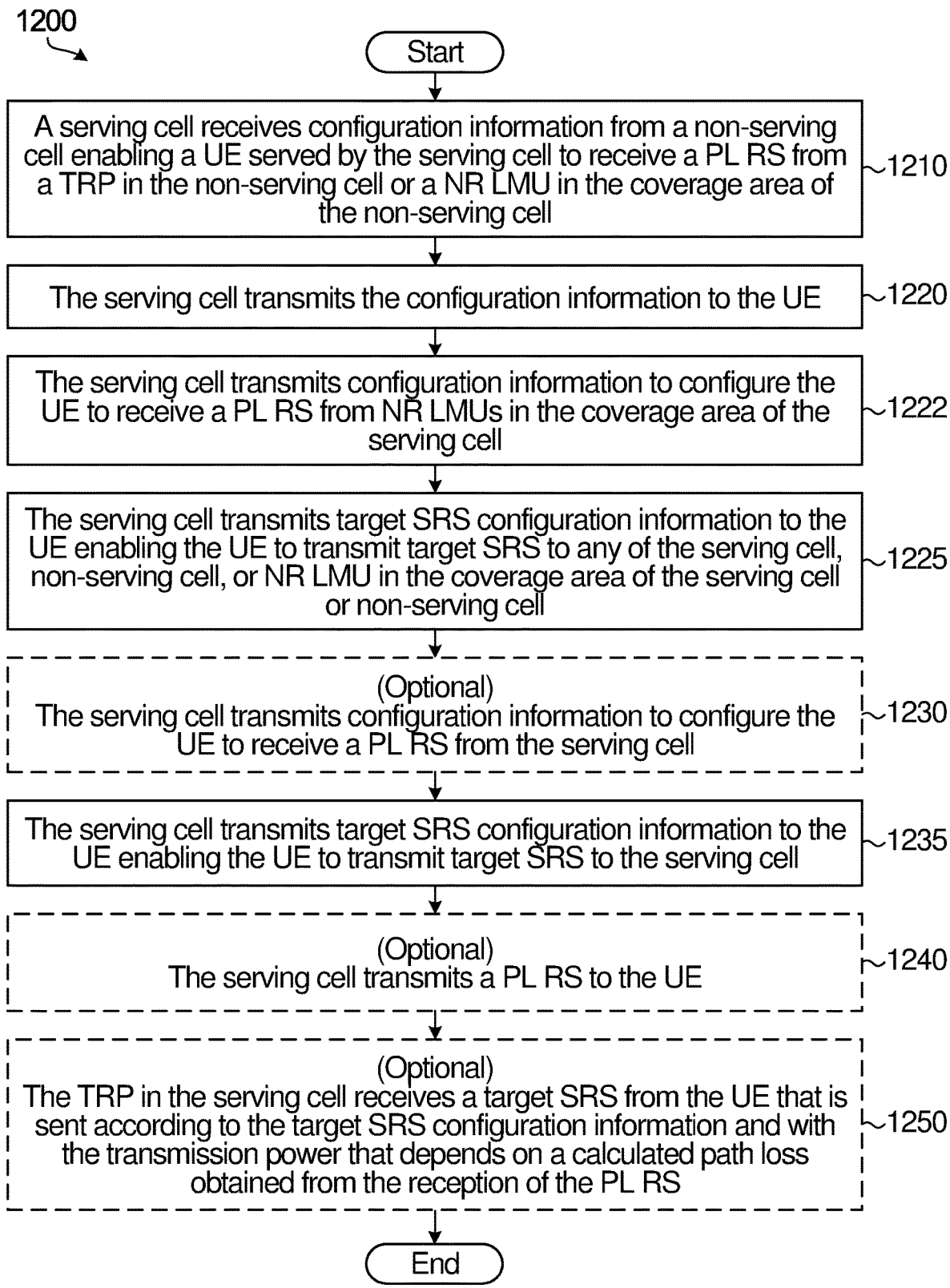
FIG. 12 is a flow chart illustrating an example of a method performed by a TRP in a non-serving cell in accordance with an embodiment of the present application.

FIG. 12 is a flow chart 1200 that illustrates steps in a method for SRS measurement. At 1210, a serving cell receives configuration information from a non-serving cell enabling a UE served by the serving cell to receive a spatial domain PL RS from a TRP in the non-serving cell or a NR LMU in the coverage area of the non-serving cell. At 1220, the serving cell transmits the received configuration information to the UE. At 1222, the serving cell transmits configuration information to configure the UE to receive a PL RS from NR LMUs in the coverage area of the serving cell. At 1225, the serving cell transmits a target SRS configuration to the UE enabling the UE to transmit target SRS to any of the serving cell, the non-serving cell, or a NR LMU in the coverage area of the serving cell or non-serving cell. At 1230, optionally, the serving cell transmits configuration information to configure the UE to receive a PL RS from the serving cell. At 1235, the serving cell transmits a target SRS configuration to the UE enabling the UE to transmit the target SRS to the serving cell. At 1240, optionally, the serving cell transmits a PL RS to the UE. At 1250, optionally, the TRP in the serving cell receives a target SRS from the UE that is sent according to the target SRS configuration (for example as transmitted in 1235) and with the transmission power that depends on the determined path loss obtained from the reception of the PL RS (for example as transmitted in 1240).

Figure 13:
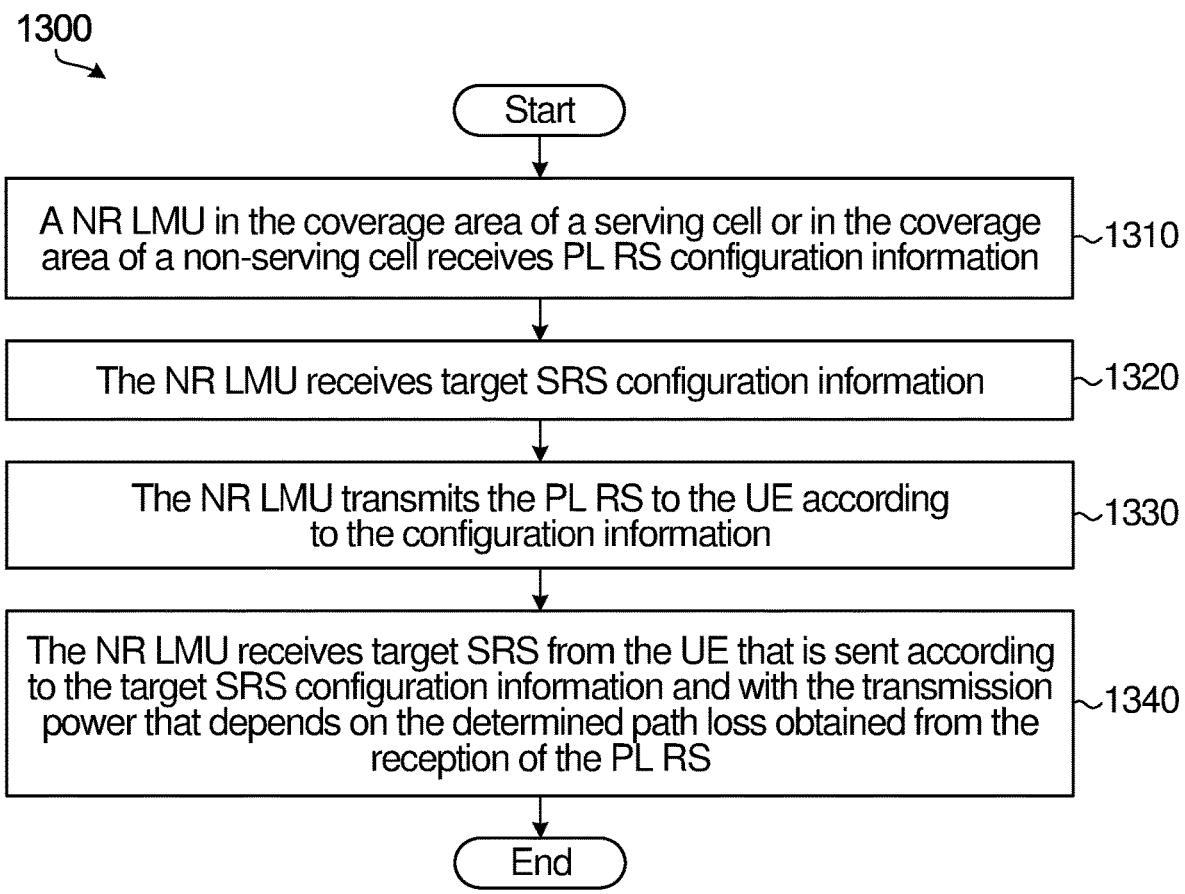
FIG. 13 is a flow chart illustrating an example of a method performed by a NR LMU in a serving cell or a non-serving cell in accordance with an embodiment of the present application.

FIG. 13 is a flow chart 1300 that illustrates steps in a method for sounding reference signal (SRS) measurement. At 1310, a NR LMU in the coverage area of a serving cell or in the coverage area of a non-serving cell receives PL RS configuration information. At 1320, the NR LMU receives target SRS configuration information. At 1330, the NR LMU transmits the PL RS to the UE according to the configuration information (for example as received in 1320). At 1340, the NR LMU receives target SRS from the UE that is sent according to the target SRS configuration and with the transmission power that depends on the determined path loss obtained from the reception of the PL RS (for example as transmitted in 1330).

It should be understood that the examples of FIGS. 6 to 13 may not necessarily always be performed in the sequential order of steps as shown in the figures. For example, configuration information may be transmitted or received in a same message, such a step 610 and 615 being received at the same time, as opposed to in a sequential order as shown in FIG. 6.

In some embodiments, configuration of each RS type (TF RS, PL RS, SRS) is known at the transmitting terminal and receiving terminal before the transmission of the same RS type.

In some embodiments, the UE should receive TF RS and PL RS before the transmission of SRS.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the figures or all of the portions schematically shown in the figures. Moreover, selected features of one example embodiment may be combined with selected features of other example embodiments.

According to one aspect of the present disclosure there is provided a method for sounding reference signal (SRS) measurement comprising: receiving, by a user equipment (UE), a first reference signal (RS) configuration information from a serving cell, the first RS configuration information associated with a network entity other than the serving cell, for enabling the UE to receive a first RS from the network entity other than the serving cell; receiving, by the UE, the first RS from the network entity other than the serving cell; transmitting, by the UE, a sounding reference signal (SRS) to the network entity other than the serving cell using a spatial domain transmission filter based on the received first RS.

In some embodiments, the first RS is a transmission filter reference signal (TF RS).

In some embodiments, the method further comprises receiving SRS configuration information separately from the first RS configuration information.

In some embodiments, the method further comprises receiving SRS configuration information in a same transmission as the first RS configuration information.

In some embodiments, the network entity other than the serving cell is a non-serving cell.

In some embodiments, the network entity other than the serving cell is a new radio location measurement unit (NR LMU).

In some embodiments, the method further comprises receiving a second RS from a second network entity other than the serving cell.

In some embodiments, the second network entity other than the serving cell is from: a) another non-serving cell; or b) another NR LMU.

In some embodiments, the first RS configuration information includes configuration information associated with the second network entity other than the serving cell, for enabling the UE to receive the second RS from the second network entity other than the serving cell.

In some embodiments, the first RS configuration information is received using higher layer signaling.

In some embodiments, the method further comprising: the UE determining a spatial domain filter for receiving the TF RS; and the UE determining that the TF RS is associated with a serving cell or a network entity of a non-serving cell based on the configuration information In some embodiments, when the TF RS is a synchronization signal/Physical Broadcast Channel (SS/PBCH) reference signal (SSB RS), the configuration information notifies the UE of: a SSB RS frequency location; a SSB RS subcarrier spacing; a SSB RS index; a physical cell identifier (PCID) of the cell transmitting the SSB RS or the cell that the NR LMU transmitting the SSB RS is within a coverage area thereof or an identifier of the NR LMU transmitting the SSB RS; and at least one of: a timing reference to obtain the time location of the SSB resource; or a synchronization signal/Physical Broadcast Channel (SS/PBCH) block measurement timing configuration (SMTC) window indication including both periodicity and offset.

In some embodiments, the SSB RS frequency location is at least one of: New Radio Absolute Radio Frequency Channel Number (NR-ARFCN) value; a relative location in a number of physical resource blocks (PRBs) or resource elements (REs) with respect to a target SRS resource location in a subcarrier spacing of the target SRS or SSB RS; and a relative location in number of PRBs or REs with respect to a SSB location that is used to obtain System Information in a subcarrier spacing of the target SRS or the SSB RS that is used to obtain System Information wherein, in this context, the system information is the information provided in Master Information block (MIB) or system information block type 1 (SIB1).

In some embodiments, the timing reference is at least one of: a timing of the serving cell in a same carrier frequency and with a same subcarrier spacing as the SSB RS; a timing of any detected cell in a same carrier frequency and with a same subcarrier spacing as the SSB RS; a timing of a primary cell (Pcell); a timing of a special cell (spCell) of a cell group that includes a serving cell that configures the target SRS resource; a timing of any serving cell in a same cell group as a serving cell that configures the target SRS resource; and a timing of an indicated serving cell.

In some embodiments, the configuration information received by the UE is in the form of an information element (IE).

In some embodiments, the IE is a "MeasObjectNR" IE or a part of a "MeasObjectNR".

In some embodiments, the "MeasObjectNR" IE is modified to indicate that the SSB RS is for determining the spatial domain TF of the target SRS resource and the SSB RS measurement does not need to be reported.

In some embodiments, the "MeasObjectNR" IE comprises a same "SSBFrequency" field as the NR-ARFCN of the TF SSB frequency and a same "ssbSubcarrierSpacing" field as the subcarrier spacing of the TF SSB and indicates the TF SSB index in the "ssb-ToMeasure" field.

In some embodiments, the "MeasObjectNR" IE comprises the PCID of the cell transmitting the TF SSB or the cell that the NR LMU transmitting the TF SSB is within a coverage area thereof.

In some embodiments, the PCID of the cell transmitting the TF SSB or the cell that the NR LMU transmitting the TF SSB is within the coverage area of is indicated in the "cellsToAddModList" field.

In some embodiments, when the TF RS is a channel state information reference signal (CSI-RS), the configuration information notifies the UE of: a RS frequency which is used for mapping of the TF CSI-RS resource in frequency domain; a RS subcarrier spacing; a physical cell identifier (PCID) of the cell transmitting the CSI-RS resource or the cell that the NR LMU transmitting the CSI-RS resource is within a coverage area thereof; a CSI-RS index; a periodicity; a timing reference to obtain the time location of the CSI-RS resource; a time offset with regard to the timing reference; reference serving cell index; sequence ID; and parameters pertaining to resource mapping.

In some embodiments, the configuration information further comprises an identification of an associated SSB resource.

In some embodiments, the configuration information further comprises an indication of whether or not the associated SSB is quasi-colocated type D (QCL-D) with the TF CSI-RS resource.

In some embodiments, when the associated SSB is configured, but not detected by the UE, the UE performing at least one of: not transmitting the SRS resource corresponding to the TF CSI-RS resource; the UE determining the spatial domain receiving filter for the TF CSI-RS resource using receive beam sweeping and using the determined spatial domain receiving filter for the spatial domain transmission of SRS resource; and the UE performing transmit beam sweeping.

In some embodiments, the parameters pertaining to resource mapping include one or more of the following: density in terms of number of resource elements/physical resource blocks (RE/PRB); number of PRBs defining the bandwidth (BW) of the CSI-RS resource; start PRB with respect to reference frequency; frequency domain allocation pattern that determines the exact TF CSI-RS REs in each PRB within TF CSI-RS BW; symbol indices within the slot; number of ports; code divisional multiplexing (CDM)-type; and frequency band.

In some embodiments, the RS frequency is at least one of: New Radio Absolute Radio Frequency Channel Number (NR-ARFCN) value; a Point A (subcarrier 0 in common resource block 0) of the cell that transmits the TF CSI-RS resource or the cell that the NR LMU transmitting the TF CSI-RS is within a coverage area thereof; a Point A (subcarrier 0 in common resource block 0) of the serving cell that configures the SRS resource; and subcarrier 0 of a lowest resource block of the SRS resource.

In some embodiments, the timing reference is at least one of: a timing of any serving cell; a timing of a special Cell (such as primary cell (PCell) or a primary secondary cell (PSCell)); a timing of an indicated reference serving cell; and a timing derived from at least the index of the associated SSB where the associated SSB may be transmitted from the same cell that transmits the TF CSI-RS resource or another cell.

In some embodiments, the configuration information received by the UE is in the form of an information element (IE).

In some embodiments, the IE is a "MeasObjectNR" IE or a part of a "MeasObjectNR" IE.

In some embodiments, the "MeasObjectNR" IE is modified to indicate that the CSI-RS resource is for determining the spatial domain TF of the target SRS resource and the CSI-RS measurement does not need to be reported.

In some embodiments, the "MeasObjectNR" IE comprises a "refFreqCSI-RS" field with the value of the Point A which is used for mapping of the TF CSI-RS resource to physical resources.

In some embodiments, the "MeasObjectNR" IE comprises the PCID of the cell transmitting the TF CSI-RS resource or the cell that the NR LMU transmitting the TF CSI-RS resource is within a coverage area thereof.

In some embodiments, the PCID of the cell transmitting the TF CSI-RS resource or the cell that the NR LMU transmitting the TF CSI-RS resource is within the coverage area of is indicated in the "cellsToAddModList" field.

According to one aspect of the present disclosure there is provided a method for sounding reference signal (SRS) measurement comprising: receiving, by a user equipment (UE), a first reference signal (RS) configuration information from a serving cell, the first RS configuration information associated with a network entity other than the serving cell, for enabling the UE to receive a first RS from the network entity other than the serving cell; the UE failing to receive the first RS from network entity other than the serving cell; the UE utilizing an alternative RS in place of the first RS; the UE transmitting a target sounding reference signal (SRS) to the network entity other than the serving cell using a spatial domain transmission filter based on the alternative RS.

In some embodiments, the alternative RS is a detected synchronization signal/Physical Broadcast Channel (SS/PBCH) reference signal (SSB RS) from a cell corresponding to the network entity other than the serving cell.

In some embodiments, when the UE detects multiple SSBs from the cell corresponding to the network entity other than the serving cell, the UE selects a SSB with a largest reference signal received power (RSRP) as the alternative RS.

In some embodiments, the alternative RS is a SSB that is used to obtain System Information.

According to one aspect of the present disclosure there is provided a method for sounding reference signal (SRS) measurement comprising: receiving, by a user equipment (UE), a first reference signal (RS) configuration information from a serving cell, the first RS configuration information associated with a network entity other than the serving cell, for enabling the UE to receive a first RS from the network entity other than the serving cell; the UE failing to receive the first RS from network entity other than the serving cell; the UE not utilizing an alternative RS in place of the first RS.

In some embodiments, the UE transmits the SRS using multiple spatial domain transmission filters in different beam directions.

In some embodiments, the UE does not transmit the SRS resource if it fails to receive the associated TF RS.

According to one aspect of the present disclosure there is provided a method for sounding reference signal (SRS) measurement, wherein when no configuration information is received by a user equipment (UE) for configuring the UE to receive a first reference signal (RS) from a target NR LMU or target cell, which can be either a serving cell or a non-serving cell, configured to transmit the first RS to the UE and receive a SRS from the UE, the method comprises: the UE receiving a notification of the physical cell identifier (PCID) of the target cell or the cell that the target NR LMU is within its coverage area; and the UE transmitting a target SRS resource with a same spatial domain TF used for detection of the SSB of the target cell.

In some embodiments, when no synchronization signal/Physical Broadcast Channel (SS/PBCH) (SSB) of the target cell is detected, the UE: transmitting the SRS resource using beam sweeping; or determining an appropriate behavior regarding whether to and how to transmit the SRS resource.

In some embodiments, when multiple synchronization signal/Physical Broadcast Channel (SS/PBCH) (SSBs) of the target cell are detected, the UE: considering a SSB with a largest reference signal received power (RSRP) as an SSB RS; or determining an appropriate behavior regarding whether to and how to transmit the SRS.

In some embodiments, when multiple synchronization signal/Physical Broadcast Channel (SS/PBCH) (SSBs) of the target cell are detected and target cell is a special cell (SpCell), the UE considering the SSB that is used to obtain System Information as the SSB RS.

According to one aspect of the present disclosure there is provided a method for sounding reference signal (SRS) measurement, wherein when no configuration information is received by a user equipment (UE) for configuring the UE to receive a first reference signal (RS) from a target NR LMU or target cell, which can be either a serving cell or a non-serving cell, configured to transmit the first RS to the UE and receive a SRS from the UE, the method comprises: the UE not receiving a notification of a physical cell identifier (PCID) of the target cell or the cell that the target NR LMU is within its coverage area; and the UE either: transmitting the SRS resource using beam sweeping; or determining an appropriate behavior regarding whether to and how to transmit the SRS.

According to one aspect of the present disclosure there is provided a method comprising: a user equipment (UE) receiving a first reference signal (RS) configuration information for configuring one or more sounding reference signal (SRS) resources in a SRS resource set, configuring the UE based upon the first RS configuration information; the UE transmitting SRS resource(s) of the SRS resource set to a target receiving point that is a serving cell, a non-serving cell, or a location measuring unit (NR LMU) that is located in the coverage area of a serving cell or a non-serving cell having a transmit power based in part on the configuration information.

In some embodiments, the method further comprises: the UE determining a transmit power of each SRS resource based in part on a received path loss reference signal (PL RS) that is configured in the SRS resource set configuration information; the PL RS being transmitted from the target serving cell or the target non-serving cell or the target NR LMU that are configured to measure the SRS resources in that SRS resource set.

In some embodiments, SRS resource set configuration information contains a physical cell identifier (PCID) of the target serving cell or the target non-serving cell or the serving cell or the non-serving cell that the target NR LMU is within a coverage area thereof.

According to one aspect of the present disclosure there is provided a method for sounding reference signal (SRS) measurement comprising: a network entity in a non-serving cell transmitting a first reference signal (RS) configuration information to a network entity in a serving cell enabling a User Equipment (UE) served by the serving cell to receive a first reference signal from the network in the non-serving cell; the network entity in the non-serving cell transmitting the first RS to the UE; the network entity in the non-serving cell receiving a target sounding reference signal (SRS) from the UE in response to the first RS transmitted by the network entity in the non-serving cell.

In some embodiments, the first RS is a transmission filter reference signal (TF RS).

In some embodiments, the method further comprises transmitting SRS configuration information separately from the first RS configuration information.

In some embodiments, the method transmitting SRS configuration information in a same transmission as the first RS configuration information.

In some embodiments, the network entity other than the serving cell is a non-serving cell.

In some embodiments, the network entity other than the serving cell is a location measurement unit (NR LMU).

According to one aspect of the present disclosure there is provided a method for sounding reference signal (SRS) measurement comprising: a network entity in a serving cell transmitting a first reference signal (RS) configuration information to a network entity in a non-serving cell; the network entity in the serving cell further transmitting the first RS configuration information to a User Equipment (UE) enabling the UE served by the serving cell to receive a first reference signal (RS) from the network entity in the non-serving cell; the network entity in the non-serving cell transmitting the first RS to the UE; the network entity in the non-serving cell receiving a target sounding reference signal (SRS) from the UE in response to the first RS transmitted by the network entity in the non-serving cell.

In some embodiments, the first RS is a transmission filter reference signal (TF RS).

In some embodiments, the method further comprises transmitting SRS configuration information separately from the first RS configuration information.

In some embodiments, the method further comprises transmitting SRS configuration information in a same transmission as the first RS configuration information.

In some embodiments, the network entity other than the serving cell is a non-serving cell.

In some embodiments, the network entity other than the serving cell is a location measurement unit (NR LMU).

According to one aspect of the present disclosure there is provided a method for sounding reference signal (SRS) measurement comprising: a network entity in a serving cell receiving a first reference signal (RS) configuration information from a network entity in a non-serving cell enabling a User Equipment (UE) served by the serving cell to receive a first reference signal (RS) from the network entity in the non-serving cell; the network entity in the serving cell transmitting the configuration information for the network entity in the non-serving cell to the UE.

In some embodiments, the first RS is a transmission filter reference signal (TF RS).

In some embodiments, the method further comprises transmitting SRS configuration information separately from the first RS configuration information.

In some embodiments, the method further comprises transmitting SRS configuration information in a same transmission as the first RS configuration information.

In some embodiments, the network entity other than the serving cell is a non-serving cell.

In some embodiments, the network entity other than the serving cell is a location measurement unit (NR LMU).

In some embodiments, the method further comprises: the network entity in the serving cell transmitting configuration information for the network entity in the serving cell to the UE; the network entity in the serving cell transmitting the first RS to the UE; and the network entity in the serving cell receiving a target sounding reference signal (SRS) from the UE in response to the first RS transmitted by the network entity in the serving cell.

According to one aspect of the present disclosure there is provided a method for sounding reference signal (SRS) measurement comprising: receiving, by a user equipment (UE), a first reference signal (RS) configuration information from a serving cell, the first RS configuration information associated with a network entity other than the serving cell, for enabling the UE to receive a first RS from the network entity other than the serving cell; receiving, by the UE, the first RS from the network entity other than the serving cell; transmitting, by the UE, the SRS to the network entity other than the serving cell using a power level based on the received first RS.

In some embodiments, the first RS is a path loss reference signal (PL RS).

In some embodiments, the method further comprises receiving SRS configuration information separately from the first RS configuration information.

In some embodiments, the method further comprises receiving SRS configuration information in a same transmission as the first RS configuration information.

In some embodiments, the network entity other than the serving cell is a non-serving cell.

In some embodiments, the network entity other than the serving cell is a location measurement unit (NR LMU).

In some embodiments, the method further comprises receiving a second RS from a second network entity other than the serving cell.

In some embodiments, the second network entity other than the serving cell is from: a) another non-serving cell; or b) another NR LMU.

In some embodiments, the first RS configuration information includes configuration information associated with the second network entity other than the serving cell, for enabling the UE to receive the second RS from the second network entity other than the serving cell.

In some embodiments, the method further comprises the UE determining a transmission power level for a target sounding reference signal (SRS) to be transmitted to the network entity other than the serving cell;

In some embodiments, the method further comprises the UE determining that the PL RS is associated with a serving cell or a network entity of a non-serving cell.

In some embodiments, the configuration information is received using higher layer signaling.

In some embodiments, when the first RS is a synchronization signal/Physical Broadcast Channel (SS/PBCH) reference signal (SSB RS), the configuration information notifies the UE of: a SSB RS frequency location; a SSB RS subcarrier spacing; a SSB RS index; a physical cell identifier (PCID) of the cell transmitting the SSB RS or a cell that the NR LMU transmitting the SSB RS is within a coverage area thereof or an identifier of the NR LMU transmitting SSB RS; and at least one of: a timing reference to obtain the time location of the SSB resource; or a synchronization signal/Physical Broadcast Channel (SS/PBCH) block measurement timing configuration (SMTC) window indication including both periodicity and offset.

In some embodiments, the SSB RS frequency location is at least one of: New Radio Absolute Radio Frequency Channel Number (NR-ARFCN) value; and a relative location in number of physical resource blocks (PRBs) or resource elements (REs) with respect to a SSB location that is used to obtain System Information in a subcarrier spacing of the target SRS or the SSB RS that is used to obtain System Information wherein the system information is the information provided in Master Information block (MIB) or system information block type 1 (SIB1).

In some embodiments, the timing reference is at least one of: a timing of the serving cell in a same carrier frequency and with a same subcarrier spacing as the SSB RS; a timing of any detected cell in a same carrier frequency and with a same subcarrier spacing as the SSB RS; a timing of a primary cell (Pcell); a timing of a special cell (spCell) of a cell group that includes a serving cell that configures the target SRS resource; a timing of any serving cell in a same cell group as a serving cell that configures the target SRS resource; and a timing of an indicated serving cell.

In some embodiments, the IE is a "MeasObjectNR" IE or a part of a "MeasObjectNR".

In some embodiments, the "MeasObjectNR" IE is modified to indicate that the SSB RS is for determining the path loss used to calculate the transmission power of the target SRS resource set and the SSB RS measurement does not need to be reported.

In some embodiments, the "MeasObjectNR" IE comprises a same "SSBFrequency" field as the NR-ARFCN of the PL SSB frequency and a same "ssbSubcarrierSpacing" field as the subcarrier spacing of the PL SSB and indicate the PL SSB index in the "ssb-ToMeasure" field.

In some embodiments, the "MeasObjectNR" IE comprises the PCID of the cell transmitting the PL SSB or the cell that the NR LMU transmitting the PL SSB is within a coverage area thereof.

In some embodiments, the UE receiving the first RS from a network entity of the serving cell or the network entity of the non-serving cell comprises the UE receiving a first reference signal (RS) from the network entity of the serving cell or the network entity of the non-serving cell, which is used as the PL RS.

In some embodiments, when the first RS is a channel state information reference signal (CSI-RS), the configuration information notifies the UE of: a RS frequency which is used for mapping of the TF CSI-RS resource in frequency domain; a RS subcarrier spacing; a physical cell identifier (PCID) of the cell transmitting the CSI-RS resource or the cell that the NR LMU transmitting the CSI-RS resource is within a coverage area thereof or an identifier of the NR LMU transmitting CSI-RS resource; a CSI-RS index; a periodicity; a timing reference to obtain the time location of the CSI-RS resource; and a time offset with regard to the timing reference; reference serving cell index; sequence ID; and parameters pertaining to resource mapping.

In some embodiments, the configuration further comprises an identification of an associated SSB resource.

In some embodiments, the parameters pertaining to resource mapping include one or more of the following: density in terms of number of resource elements/physical resource blocks (RE/PRB); number of PRBs defining the bandwidth (BW) of the CSI-RS resource; start PRB with respect to reference frequency; frequency domain allocation pattern that determines the exact TF CSI-RS REs in each PRB within TF CSI-RS BW; symbol indices within the slot; number of ports; code divisional multiplexing (CDM)-type; and frequency band.

In some embodiments, the associated SSB is QCL-Type D with the PL CSI-RS resource.

In some embodiments, the RS frequency is at least one of: New Radio Absolute Radio Frequency Channel Number (NR-ARFCN) value; a Point A (subcarrier 0 in common resource block 0) of the cell that transmits the PL CSI-RS resource or the cell that the NR LMU transmitting the PL CSI-RS is within a coverage area thereof; and a Point A (subcarrier 0 in common resource block 0) of the serving cell that configures the SRS resource.

In some embodiments, the first RS configuration information received by the UE is in the form of an information element (IE).

In some embodiments, the IE is a "MeasObjectNR" IE or a part of a "MeasObjectNR" IE.

In some embodiments, the "MeasObjectNR" IE is modified to indicate that the CSI-RS resource is for determining the path loss of the target SRS resource and the CSI-RS resource measurement does not need to be reported.

In some embodiments, the "MeasObjectNR" IE comprises a "refFreqCSI-RS" field with the value of the Point A which is used for mapping of the PL CSI-RS resource to physical resources.

In some embodiments, the "MeasObjectNR" IE comprises the PCID of the cell transmitting the PL CSI-RS resource or the cell that the NR LMU transmitting the PL CSI-RS resource is within a coverage area thereof.

In some embodiments, the PCID of the cell transmitting the PL CSI-RS resource or the cell that the NR LMU transmitting the PL CSI-RS resource is within the coverage area thereof is indicated in the "cellsToAddModList" field.

In some embodiments, the UE receiving the PL RS from the serving cell or the network entity of the non-serving cell comprises the UE receiving a spatial domain transmission filter reference signal (TF RS) from the serving cell or the network entity non-serving cell, which is used as the PL RS.

In some embodiments, a spatial domain filter for the reception of the PL RS from any of the serving cell or the network entity of the non-serving cell is determined at the UE based on at least one of: prior knowledge; quasi-co-location type D (QCL-D) between the PL CSI-RS resource and an associated SSB that is indicated in the received configuration information; QCL-D between the PL CSI-RS resource with another known downlink reference signal (DL RS); and receive beam sweeping at the UE.

According to one aspect of the present disclosure there is provided a method for sounding reference signal (SRS) measurement comprising: a user equipment (UE) receiving a first reference signal (RS) configuration information enabling the UE to receive a first reference signal (RS) from a network entity of a non-serving cell configured to transmit the first RS to the UE and receive a SRS from the UE; the UE failing to receive the first RS from the network entity other than the serving cell; the UE utilizing an alternative RS in place of the intended PL RS; determining a transmission power level for a target sounding reference signal (SRS) to be transmitted to the network entity other than the serving cell; transmitting, by the UE, the SRS to the network entity other than the serving cell using a power level based on the received first RS.

In some embodiments, the first RS is a path loss reference signal (PL RS).

In some embodiments, the method further comprises receiving SRS configuration information separately from the first RS configuration information.

In some embodiments, the method further comprises receiving SRS configuration information in a same transmission as the first RS configuration information.

In some embodiments, the network entity other than the serving cell is a non-serving cell.

In some embodiments, the network entity other than the serving cell is a location measurement unit (NR LMU).

In some embodiments, the method further comprises receiving a second RS from a second network entity other than the serving cell.

In some embodiments, the second network entity other than the serving cell is from: a) another non-serving cell; or b) another NR LMU.

In some embodiments, the first RS configuration information includes configuration information associated with the second network entity other than the serving cell, for enabling the UE to receive the second RS from the second network entity other than the serving cell.

In some embodiments, the method further comprises the UE determining that the PL RS is associated with a serving cell or a network entity of a non-serving cell.

In some embodiments, the alternative RS is one of: a detected SSB from the cell indicated in the configuration of the PL RS; and a SSB that is used to obtain System Information where, in this context, the system information is the information provided in Master Information block (MIB) or system information block type 1 (SIB1).

In some embodiments, the alternative RS for the SRS-Resource set that is configured to be received at a non-serving cell or a NR LMU is the PL SSB of the SRS Resource set that is configured for the serving cell.

In some embodiments, when multiple SSBs of the target cell are detected, then the UE determines how to determine the transmission power level based on received power from the detected SSBs of the cell.

In some embodiments, when multiple SSBs of the target cell are detected, then the UE considers a SSB with a largest reference signal received power (RSRP) as the SSB RS.

In some embodiments, the UE determines how to determine the transmission power level.

In some embodiments, the UE does not transmit the corresponding SRS Resource set for positioning.

According to one aspect of the present disclosure there is provided a method for sounding reference signal (SRS) measurement, wherein when no configuration information is received by a user equipment (UE) for configuring the UE to receive a path loss reference signal (PL RS) from a location measurement unit (NR LMU) or a target cell, which can be either of a serving cell or a non-serving cell, configured to transmit the PL RS to the UE and receive a SRS from the UE, the method comprises: the UE receiving a notification of the physical cell identifier (PCID) of the target cell or the cell that the target NR LMU is within a coverage area of; determining a transmission power level for a target sounding reference signal (SRS) to be transmitted to the target cell.

In some embodiments the method further comprises the UE transmitting the target SRS to the target cell.

In some embodiments, when no SSB of the target cell is detected, then the UE performs one of the following: calculates path loss (PL) from the SSB that is used to obtain System Information (MIB or SIB1); or calculates PL using the PL RS that is transmitted from the serving cell.

In some embodiments, when multiple SSBs of the target cell are detected, then the UE considers a SSB with a largest reference signal received power (RSRP) as the SSB RS.

In some embodiments, when multiple SSBs of the target cell are detected and target cell is a special cell (SpCell), then the UE considers the SSB that is used to obtain System Information (MIB or SIB1) as the SSB RS.

According to one aspect of the present disclosure there is provided a method for sounding reference signal (SRS) measurement, wherein when no configuration information is received by a user equipment (UE) for configuring the UE to receive a path loss reference signal (PL RS) from a NR LMU or a target cell, which can be either of a serving cell or a non-serving cell, and the UE does not receive a notification of the physical cell identifier (PCID) of the target cell or the cell that the target NR LMU is within its coverage area; the method comprises: determining a transmission power level for a target sounding reference signal (SRS).

In some embodiments, the method further comprises the UE transmitting the target SRS.

In some embodiments, the UE performs one of the following: calculates path loss (PL) from the SSB that is used to obtain System Information (MIB or SIB1); calculates path loss using the PL RS that is transmitted from the serving cell; determines how to determine the transmission power level; does not transmit the corresponding SRS Resource set for positioning.

According to one aspect of the present disclosure there is provided a method for determining a power adjustment value for a transmission power level for a target sounding reference signal (SRS) to be transmitted to a non-serving cell or a NR LMU within the coverage area of a non-serving cell, the method comprising: a user equipment (UE), determining the power adjustment value using the formula $h_{b,f,c}(i,l)=\delta+(c-1)\times s$, wherein $\delta$ (dB) is a tuning value, c is integer variable, and $s \geq 0$ (dB) is a SRS power ramping step based on higher layer signaling; determining the transmission power level based on a base power level and the power adjustment value; and transmitting the SRS with the determined transmission.

In some embodiments, determining the power adjustment value comprises incrementing c by 1 at each SRS transmission until the SRS power reaches a maximum threshold or a power ramping suspension message is received from lower layers.

In some embodiments, determining the power adjustment value comprises incrementing c by one when a power ramping message is received from lower layers.

In some embodiments, determining the power adjustment value comprises resetting c equal to 1 when a power ramping reset message is received from lower layers.

In some embodiments, the base power level is determined based on the expression $P_{0_{SRS}},b,f,c(q_s)+10 \log_{10}(2^\mu \cdot M_{SRS,b,f,c}(i)+\alpha_{SRS,b,f,c}(q_d)$, wherein $M_{SRS,b,f,c}(i)$ $M_{SRS,b,f,c}(i)$ is SRS bandwidth (BW) in resource blocks (RBs) per SRS resource $P_{0_{SRS}},b,f,c(q_s)$ is a power level value configured by higher layers, $\alpha_{SRSb,f,c}(q_s)$ is a higher layer configured scaling factor per SRS resource set, and $PL_{b,f,c}(q_d)$ is calculated pathloss in dB based on the pathloss RS $q_d$.

In some embodiments, pathloss RS $q_d$ configured in active DL BWP of the UE per SRS Resource Set.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method comprising:
    receiving, by a user equipment (UE) from a serving cell, downlink (DL) reference signal (RS) configuration information for configuring the UE to receive a first DL RS from a non-serving cell, wherein the non-serving cell is a cell other than any cell that serves the UE, and wherein the DL RS configuration information for configuring the UE to receive the first DL RS from the non-serving cell indicates:
    a Synchronization Signal/Physical Broadcast Channel (SS/PBCH) block frequency location;
    an SS/PBCH block subcarrier spacing;
    an SS/PBCH block index;
    a physical cell identifier (PCID) of a cell transmitting an SS/PBCH block; and
    a timing reference to obtain a time location of the SS/PBCH block;
    receiving, by the UE from the non-serving cell, the first DL RS; and
    transmitting, by the UE, a sounding reference signal (SRS), the SRS transmitted in accordance with a transmission parameter, the transmission parameter including a transmit power obtained based on a pathloss estimated from the first DL RS received from the non-serving cell.

2. The method of claim 1, wherein the first DL RS is the SS/PBCH block.

3. The method of claim 1, wherein the DL RS configuration information further configures the UE to receive a second DL RS from the non-serving cell, and the transmission parameter further includes a spatial domain transmission filter obtained based on the second DL RS.

4. The method of claim 3, wherein the transmitting, by the UE, the SRS comprises transmitting the SRS in accordance with the spatial domain transmission filter, the spatial domain transmission filter being the same as a spatial domain filter used for receiving the second DL RS.

5. The method of claim 4, wherein the DL RS configuration information is received using higher layer signaling, and the higher layer signaling comprises a higher layer parameter indicating the second DL RS used for obtaining the spatial domain transmission filter.

6. The method of claim 3, wherein the first DL RS is same as the second DL RS.

7. The method of claim 3, wherein the second DL RS is an SS/PBCH or a channel state information reference signal (CSI-RS).

8. The method of claim 1, wherein the indication further indicates:
    a SS/PBCH block measurement timing configuration (SMTC) window indication including both periodicity and offset.

9. The method of claim 1, wherein the SS/PBCH block frequency location is a New Radio Absolute Radio Frequency Channel Number (NR-ARFCN) value.

10. The method of claim 1, wherein the timing reference is a timing of a primary cell (Pcell).

11. The method of claim 1, wherein the DL RS configuration information is received using higher layer signaling, and the higher layer signaling comprises a higher layer parameter indicating the first DL RS used for estimating the pathloss.

12. The method of claim 1, wherein the transmitting, by the UE, the SRS comprises:
    transmitting the SRS using an SRS resource of an SRS resource set in accordance with the transmission parameter obtained based on the first DL RS; or transmitting the SRS using all SRS resources of the SRS resource set in accordance with the transmission parameter obtained based on the first DL RS.

13. The method of claim 1, wherein the non-serving cell is a neighbor cell.

14. A user equipment (UE) comprising:
    at least one processor;
    a non-transitory computer-readable storage medium having stored thereon, computer-executable instructions that when executed by the at least one processor cause the UE to:
    receive, from a serving cell, downlink (DL) reference signal (RS) configuration information for configuring the UE to receive a first DL RS from a non-serving cell, wherein the non-serving cell is a cell other than any cell that serves the UE, and wherein the DL RS configuration information for configuring the UE to receive the first DL RS from the non-serving cell indicates:
    a Synchronization Signal/Physical Broadcast Channel (SS/PBCH) block frequency location;
    an SS/PBCH block subcarrier spacing;
    an SS/PBCH block index;
    a physical cell identifier (PCID) of a cell transmitting an SS/PBCH block; and
    a timing reference to obtain a time location of the SS/PBCH block;
    receive, from the non-serving cell, the first DL RS; and
    transmit, a sounding reference signal (SRS), the SRS transmitted in accordance with a transmission parameter, the transmission parameter including a transmit power based on a pathloss estimated from the first DL RS received from the non-serving cell.

15. The UE of claim 14, wherein the first DL RS is the SS/PBCH block.

16. The UE of claim 14, wherein the DL RS configuration information further configures the UE to receive a second DL RS from the non-serving cell, and the transmission parameter further includes a spatial domain transmission filter based on the second DL RS.

17. The UE of claim 16, wherein the computer-executable instructions, that when executed by the at least one processor cause the UE to transmit the SRS, include computer-executable instructions to cause the UE to:
   transmit the SRS in accordance with the spatial domain transmission filter, the spatial domain transmission filter being the same as a spatial domain filter used for receiving the second DL RS.

18. The UE of claim 17, wherein the DL RS configuration information is received using higher layer signaling, and the higher layer signaling comprises a higher layer parameter indicating the second DL RS used for obtaining the spatial domain transmission filter.

19. The UE of claim 16, wherein the first DL RS is same as the second DL RS.

20. The UE of claim 16, wherein the second DL RS is an SS/PBCH or a channel state information reference signal (CSI-RS).

21. The UE of claim 15, wherein the computer-executable instructions, that when executed by the at least one processor cause the UE to transmit the SRS, include computer-executable instructions to cause the UE to:
   transmit the SRS using an SRS resource of an SRS resource set in accordance with the transmission parameter based on the first DL RS; or transmit the SRS using all SRS resources of the SRS resource set in accordance with the transmission parameter based on the first DL RS.

22. The UE of claim 14, wherein the SS/PBCH block frequency location is a New Radio Absolute Radio Frequency Channel Number (NR-ARFCN) value.

23. The UE of claim 14, wherein the timing reference is a timing of a primary cell (Pcell).

24. The UE of claim 14, wherein the DL RS configuration information is received using higher layer signaling, and the higher layer signaling comprises a higher layer parameter indicating the first DL RS used for estimating the pathloss.

25. The UE of claim 14, wherein the non-serving cell is a neighbor cell.

26. A method comprising:
   receiving, by a user equipment (UE), higher layer signaling including a configuration message configuring a first Synchronization Signal/Physical Broadcast Channel (SS/PBCH) block for pathloss estimation by the UE, wherein the configuration message in the higher layer signaling indicates:
   an SS/PBCH block frequency location,
   an SS/PBCH block subcarrier spacing,
   an SS/PBCH block index,
   a physical cell identifier (PCID) of a serving cell transmitting the first SS/PBCH block, and
   a timing reference to obtain a time location of the first SS/PBCH block;
   after the receiving the higher layer signaling and in response to the UE failing to detect the first SS/PBCH block from the serving cell:
   receiving, by the UE, a second SS/PBCH block from the serving cell, the second SS/PBCH block used for obtaining a Master Information Block (MIB), the second SS/PBCH block being different from the first SS/PBCH block;
   estimating, by the UE, pathloss from the second SS/PBCH block; and
   transmitting, by the UE, a sounding reference signal (SRS) to a non-serving cell using a transmit power based on the pathloss estimated from the second SS/PBCH block used for obtaining the MIB.

27. The method of claim 26, wherein the first SS/PBCH block and the second SS/PBCH block are in a same carrier frequency.

28. A user equipment (UE) comprising:
   at least one processor;
   a computer-readable storage medium having stored thereon, computer-executable instructions that when executed by the at least one processor cause the UE to perform operations including:
   receiving higher layer signaling including a configuration message configuring a first Synchronization Signal/Physical Broadcast Channel (SS/PBCH) block for pathloss estimation by the UE, wherein the configuration message in the higher layer signaling indicates:
   an SS/PBCH block frequency location,
   an SS/PBCH block subcarrier spacing,
   an SS/PBCH block index,
   a physical cell identifier (PCID) of a serving cell transmitting the first SS/PBCH block, and
   a timing reference to obtain a time location of the first SS/PBCH block;
   after the receiving the higher layer signaling and in response to failing to detect the first SS/PBCH block from the serving cell:
   receiving a second SS/PBCH block from the serving cell, the second SS/PBCH block used for obtaining a Master Information Block (MIB), the second SS/PBCH block being different from the first SS/PBCH block;
   estimating pathloss from the second SS/PBCH block; and
   transmitting a sounding reference signal (SRS) to a non-serving cell using a transmit power based on the pathloss estimated from the second SS/PBCH block used for obtaining the MIB.

* * * * *